US012689562B2

(12) United States Patent
Reeves et al.

(10) Patent No.: US 12,689,562 B2
(45) Date of Patent: Jul. 21, 2026

(54) SYSTEMS AND METHODS OF A DIGITAL TWIN NETWORK FOR COMMUNICATING WITH VIRTUAL WORLD ENVIRONMENTS

(71) Applicant: T-Mobile USA, Inc., Bellevue, WA (US)

(72) Inventors: Raymond E. Reeves, Orlando, FL (US); Simon Youngs, Overland Park, KS (US)

(73) Assignee: T-Mobile USA, Inc., Bellevue, WA (US)

( * ) Notice: Subject to any disclaimer, the term of this patent is extended or adjusted under 35 U.S.C. 154(b) by 76 days.

(21) Appl. No.: 18/940,549

(22) Filed: Nov. 7, 2024

(65) Prior Publication Data

US 2026/0128954 A1    May 7, 2026

(51) Int. Cl.
H04L 41/147 (2022.01)

(52) U.S. Cl.
CPC .................................. H04L 41/147 (2013.01)

(58) Field of Classification Search
CPC ..... H04L 41/147; H04L 41/16; H04L 41/145; H04L 41/5019; G06N 5/022; G06N 20/00; G06N 3/006; G06N 3/008; G06N 5/02; G06N 7/01; G06N 7/06; G06F 30/20; H04W 16/22; H04W 24/02; H04W 24/06; H04W 84/18
See application file for complete search history.

(56) References Cited

U.S. PATENT DOCUMENTS

| | | | |
|---|---|---|---|
| 6,286,047 | B1 | 9/2001 | Ramanathan et al. |
| 6,363,411 | B1 | 3/2002 | Dugan et al. |
| 6,577,642 | B1 | 6/2003 | Fijolek et al. |
| 6,763,226 | B1 | 7/2004 | Mczeal |
| 6,788,649 | B1 | 9/2004 | Dugan et al. |
| 6,804,711 | B1 | 10/2004 | Dugan et al. |
| 6,954,790 | B2 | 10/2005 | Forsloew |
| 6,975,995 | B2 | 12/2005 | Kim |
| 7,058,707 | B1 | 6/2006 | Cerami et al. |

(Continued)

FOREIGN PATENT DOCUMENTS

| | | |
|---|---|---|
| CN | 118784361 A | 10/2024 |
| KR | 102497737 B1 | 2/2023 |

(Continued)

*Primary Examiner* — Greg C Bengzon

(74) *Attorney, Agent, or Firm* — Perkins Coie LLP

(57) ABSTRACT

Systems and methods are disclosed comprising techniques for modular synthetic modeling, such as receiving a user request from a virtual world environment for transmitting data using synthetic network services of a digital twin network, determining a network user identifier of a subscribing user of a telecommunications network that is associated with a virtual user identifier of the user request, accessing a service modality configuration of the digital twin network that maps a data payload of the user request to a set of available synthetic network services, selecting a synthetic network service of the digital twin network for transmitting the data payload, transmitting the data payload of the user request via the selected synthetic network service of the digital twin network, and applying a corrective adjustment to a runtime configuration of the synthetic network service in response to at least one monitored KPI exceeding a tolerance threshold.

19 Claims, 7 Drawing Sheets

(56) References Cited

U.S. PATENT DOCUMENTS

| | | | |
|---|---|---|---|
| 7,197,553 B2 | 3/2007 | Roberts et al. | |
| 7,328,262 B2 | 2/2008 | Mcdonagh et al. | |
| 7,447,622 B2 * | 11/2008 | Arama | H04L 43/50 |
| | | | 709/200 |
| 7,684,321 B2 | 3/2010 | Muirhead et al. | |
| 7,710,936 B2 | 5/2010 | Morales | |
| 7,779,154 B2 | 8/2010 | Lipsanen et al. | |
| 7,801,995 B2 | 9/2010 | Lake et al. | |
| 7,949,871 B2 | 5/2011 | Randle et al. | |
| 8,250,207 B2 | 8/2012 | Raleigh | |
| 9,565,318 B2 | 2/2017 | Tapia et al. | |
| 9,569,598 B2 | 2/2017 | Abuelsaad et al. | |
| 9,571,517 B2 | 2/2017 | Vallone et al. | |
| 9,659,251 B2 | 5/2017 | Tang et al. | |
| 9,853,922 B2 | 12/2017 | Brody et al. | |
| 10,994,198 B1 * | 5/2021 | Byskal | G06F 9/50 |
| 11,076,004 B2 | 7/2021 | Yerli | |
| 12,167,264 B1 * | 12/2024 | McEvilly | H04L 43/0876 |
| 12,335,579 B2 * | 6/2025 | Ashwathappa | H04N 21/64784 |
| 12,530,605 B2 * | 1/2026 | Tashman | G06N 5/022 |
| 2003/0117954 A1 | 6/2003 | De et al. | |
| 2004/0064504 A1 | 4/2004 | Domschitz | |
| 2004/0255137 A1 | 12/2004 | Mng | |
| 2005/0201532 A1 | 9/2005 | Chang | |
| 2005/0254440 A1 | 11/2005 | Sorrell | |
| 2006/0101116 A1 | 5/2006 | Rittman et al. | |
| 2006/0165040 A1 | 7/2006 | Rathod et al. | |
| 2006/0167983 A1 | 7/2006 | Webb | |
| 2006/0235791 A1 | 10/2006 | Jung et al. | |
| 2007/0073582 A1 | 3/2007 | Jung et al. | |
| 2007/0156509 A1 | 7/2007 | Jung et al. | |
| 2007/0203828 A1 | 8/2007 | Jung et al. | |
| 2009/0144132 A1 | 6/2009 | Jung et al. | |
| 2010/0217812 A1 | 8/2010 | Roebke | |
| 2010/0271951 A1 | 10/2010 | Dujardin et al. | |
| 2011/0151845 A1 | 6/2011 | Staykoff | |
| 2011/0191417 A1 | 8/2011 | Rathod | |
| 2011/0243553 A1 | 10/2011 | Russell | |
| 2011/0283343 A1 | 11/2011 | Jaeger et al. | |
| 2014/0243094 A1 | 8/2014 | Tayloe et al. | |
| 2017/0050111 A1 * | 2/2017 | Perry | H04L 67/131 |
| 2017/0250892 A1 | 8/2017 | Cooper et al. | |
| 2017/0257324 A1 | 9/2017 | Balmakhtar et al. | |

| | | | |
|---|---|---|---|
| 2018/0302496 A1 | 10/2018 | Tarasenko et al. | |
| 2018/0350144 A1 | 12/2018 | Rathod | |
| 2019/0372826 A1 * | 12/2019 | Sherr | H04L 41/046 |
| 2022/0045967 A1 * | 2/2022 | Hu | H04L 47/805 |
| 2022/0067233 A1 * | 3/2022 | Blackwell, II | A63F 13/65 |
| 2022/0292543 A1 | 9/2022 | Henderson | |
| 2022/0345386 A1 * | 10/2022 | Madanapalli | H04L 47/2441 |
| 2023/0180019 A1 * | 6/2023 | Martin | H04W 16/18 |
| | | | 455/446 |
| 2023/0274170 A1 * | 8/2023 | Tashman | G06N 5/022 |
| | | | 706/52 |
| 2023/0276192 A1 * | 8/2023 | Cotanis | H04W 24/04 |
| | | | 455/419 |
| 2023/0379551 A1 * | 11/2023 | Ashwathappa | H04N 21/64738 |
| 2023/0396650 A1 * | 12/2023 | Bleibtrey | H04L 63/10 |
| 2024/0112506 A1 * | 4/2024 | Smith | G07C 5/008 |
| 2024/0144150 A1 * | 5/2024 | Johnston | G06Q 10/06398 |
| 2024/0144588 A1 * | 5/2024 | Dasher | G06Q 30/0643 |
| 2024/0154876 A1 * | 5/2024 | Yuan | H04L 41/0806 |
| 2024/0187348 A1 * | 6/2024 | Ögren | H04L 47/25 |
| 2024/0203047 A1 * | 6/2024 | Lu | G06T 17/00 |
| 2024/0281671 A1 * | 8/2024 | Phokela | G06N 5/022 |
| 2024/0302516 A1 * | 9/2024 | Ibrahim | G01S 13/42 |
| 2024/0338592 A1 * | 10/2024 | Yarabolu | G06N 20/00 |
| 2024/0356946 A1 * | 10/2024 | Sapir | H04L 63/1425 |
| 2024/0356977 A1 * | 10/2024 | Sapir | H04L 63/20 |
| 2025/0004883 A1 * | 1/2025 | Ezrielev | G06F 1/26 |
| 2025/0103315 A1 * | 3/2025 | Dubrovsky | G06F 30/20 |
| 2025/0106647 A1 * | 3/2025 | Pateromichelakis | H04W 24/06 |
| 2025/0110682 A1 * | 4/2025 | Chen | G06F 3/1454 |
| 2025/0193085 A1 * | 6/2025 | Das | H04W 24/06 |
| 2025/0217114 A1 * | 7/2025 | Roper, Jr. | G06N 3/02 |
| 2025/0245260 A1 * | 7/2025 | Si | G06N 3/0455 |
| 2025/0252234 A1 * | 8/2025 | Liao | G06F 30/27 |
| 2026/0006497 A1 * | 1/2026 | Pateromichelakis | H04L 67/131 |
| 2026/0030415 A1 * | 1/2026 | Roper, Jr. | G05B 17/02 |

FOREIGN PATENT DOCUMENTS

| | | |
|---|---|---|
| WO | 2012019317 A1 | 2/2012 |
| WO | 2014058299 A1 | 4/2014 |
| WO | 2018122709 A1 | 7/2018 |
| WO | 2020226979 A2 | 11/2020 |

* cited by examiner

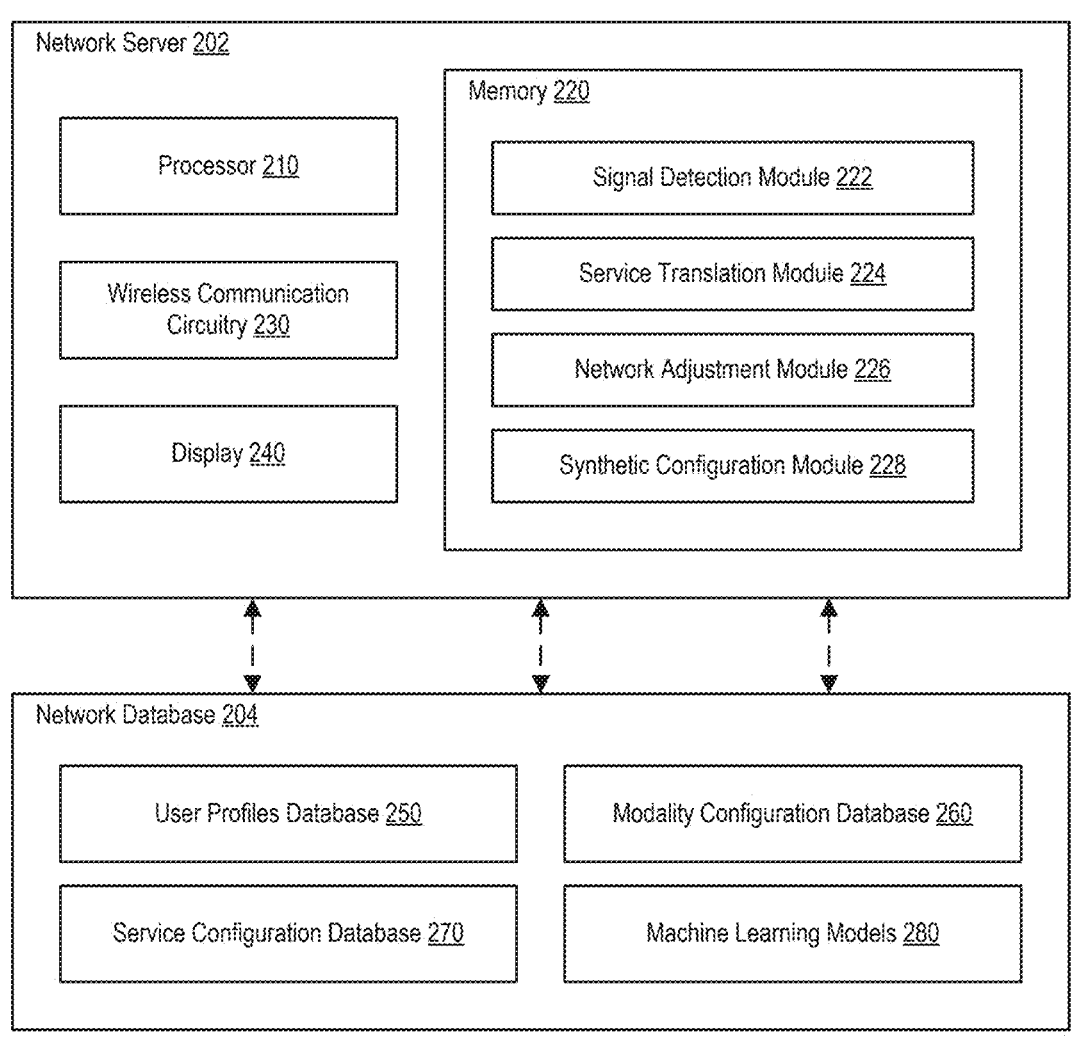
*FIG. 2*

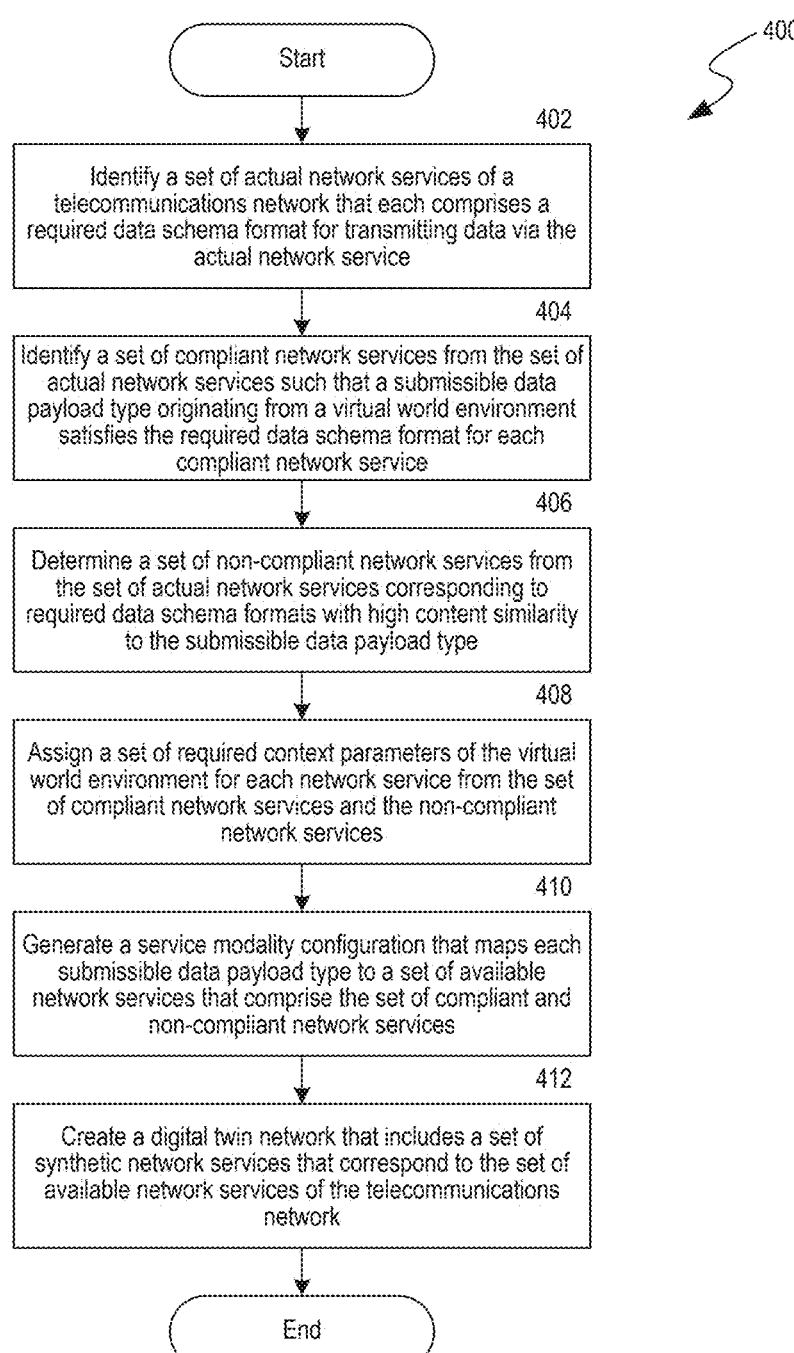

400

Start

402

Identify a set of actual network services of a telecommunications network that each comprises a required data schema format for transmitting data via the actual network service

404

Identify a set of compliant network services from the set of actual network services such that a submissible data payload type originating from a virtual world environment satisfies the required data schema format for each compliant network service

406

Determine a set of non-compliant network services from the set of actual network services corresponding to required data schema formats with high content similarity to the submissible data payload type

408

Assign a set of required context parameters of the virtual world environment for each network service from the set of compliant network services and the non-compliant network services

410

Generate a service modality configuration that maps each submissible data payload type to a set of available network services that comprise the set of compliant and non-compliant network services

412

Create a digital twin network that includes a set of synthetic network services that correspond to the set of available network services of the telecommunications network

End

*FIG. 4*

SYSTEMS AND METHODS OF A DIGITAL TWIN NETWORK FOR COMMUNICATING WITH VIRTUAL WORLD ENVIRONMENTS

BACKGROUND

A virtual world, or a virtual space, is a computer-simulated environment which may be populated by many simultaneous users who can create a personal avatar and independently explore the virtual world, participate in its activities, and communicate with others. These avatars can be textual, graphical representations, or live video avatars with auditory and touch sensations.

In a virtual world, the user accesses a computer-simulated world which presents perceptual stimuli to the user, who in turn can manipulate elements of the modeled world and thus experience a degree of presence. Such modeled worlds and their rules may draw from reality or fantasy worlds. Example rules are gravity, topography, locomotion, real-time actions, and communication. Communication between users can range from text, graphical icons, visual gesture, sound, and rarely, forms using touch, voice command, and balance senses.

As an example, massively multiplayer online games (MMORPGs) depict a wide range of worlds, including those based on the real world, science fiction, superheroes, sports, horror, and historical milieus. Most MMORPGs have real-time actions and communication. Players create a character who travels between buildings, towns, and worlds to carry out business or leisure activities. Communication between players, such as text messages or voice communication, are often facilitated by the virtual world. The form of communication used can substantially affect the experience of players in the game. Virtual worlds are not limited to games but, depending on the degree of immediacy presented, can encompass computer conferencing and text-based chatrooms.

BRIEF DESCRIPTION OF THE DRAWINGS

Detailed descriptions of implementations of the present invention will be described and explained through the use of the accompanying drawings.

FIG. 2 is a block diagram that illustrates a modular synthetic modeling system that can implement aspects of the present technology.

FIG. 4 is a flow diagram that illustrates a process to generate a digital twin network in some implementations.

Figure 1:
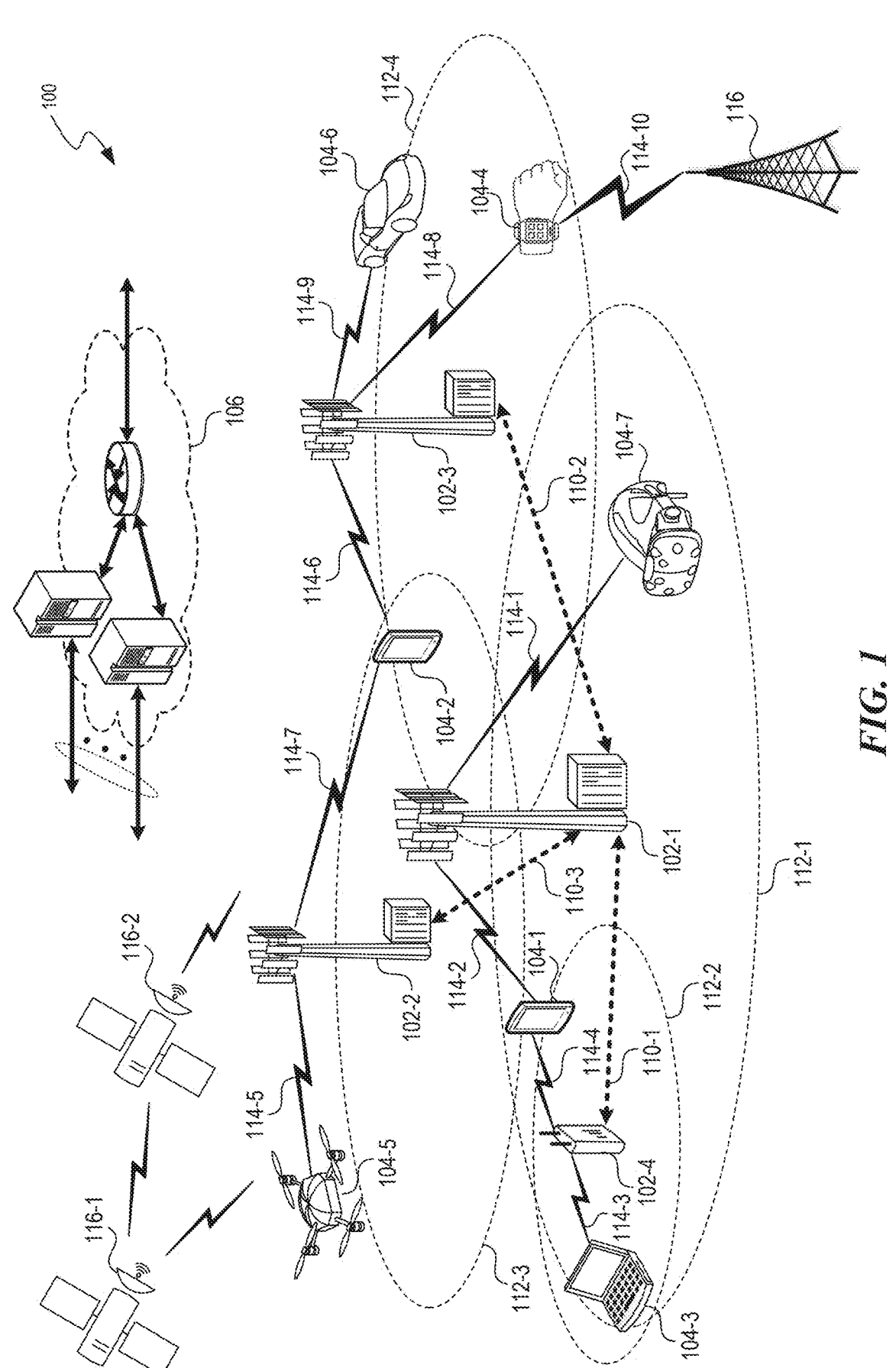
FIG. 1 is a block diagram that illustrates a wireless communications system that can implement aspects of the present technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Conventional virtual world environments (e.g., computer-simulated environments, virtual/augmented reality, and/or the like) include built-in interactive services that enable participant users to communicate and transfer data (e.g., text messages, audio recordings, and/or the like) with one another. As an illustrative example, communal virtual spaces, such as a metaverse, often host (e.g., within the virtual environment) readily available communication tools (e.g., a personal messaging application, a voice call service, and/or the like) that connect multiple participant users. With increasing popularity among consumers, virtual world environments present significant low-cost opportunities for acquiring extensive data associated with broader user interaction patterns and approximate performance of real-world communication infrastructures (e.g., a telecommunications network, a satellite network, and/or the like).

However, existing communication tools within virtual world environments are limited in their ability to emulate the functions and relative performance (e.g., data transfer rate, error frequency, network traffic, and/or the like) of real-world communication services (e.g., telecommunications network). For instance, conventional virtual spaces typically rely on simple interfaces and/or services (e.g., a text-based chat system) to facilitate direct communications between participant users. In such cases, these virtual spaces are often configured with simplified protocols to transmit communications data (e.g., messages, audio, and/or the like) between participant users immediately with minimum time delays (e.g., in near real time).

In contrast, transmitting data using real-world communications infrastructures (e.g., telecommunications network) involves processing transmitted data via multiple interdependent components (e.g., individual network nodes, routers, and/or services) under dynamic conditions (e.g., network traffic flow, climate impacts on service hardware, and/or other unknown physical variables), which often causes time delays and/or additional redundancies (e.g., data replication, failover systems, and/or the like). To further compound the issue, hosting emulated functions of realistic communication infrastructures (e.g., telecommunications network) alongside, or within, virtual world environments will require significant computational resources, which can cause performance degradations (e.g., latency, congestion, and/or the like) for the virtual environment, the synthetic communication infrastructure, or both. As a result, there is a clear need for a robust synthetic modeling system that can emulate functionality and performance of real-world communication infrastructures for virtual world environments without diminishing the overall user experience and incurring significant computational costs.

Disclosed herein are systems and related methods for building and operating a digital twin model (e.g., a virtual representation) of a telecommunications network for emulating real network service features (e.g., a messaging service, a voice call, a data transfer, and/or the like) with respect to virtual world environments. The disclosed system can establish a modality configuration for translating user communications activities (e.g., data transmission requests)

from a virtual world environment to an acceptable format (e.g., a data schema) for synthetic network services (e.g., emulated telecommunications network features) of the digital twin network. By leveraging generative machine learning models (e.g., large language models) to identify content similarities between data schemas of network services and submissible data types of the virtual world environment, the disclosed system can map incoming virtual user requests to relevant network services capable of facilitating synthetic communication activities (e.g., data transmission). Further, the system can use the mapping to determine an acceptable format for presenting transmitted data (e.g., via synthetic network services) at user interactable elements of the virtual world environment.

The disclosed system can iteratively adjust (e.g., self-organizing) runtime configurations of actual network services (e.g., or synthetic network services) via monitoring performance of network services executed by the digital twin network (e.g., or the actual telecommunications network). For example, the system can adjust runtime configurations of actual network services when a monitored key performance indicator (KPI) of synthetic network services exceeds a tolerance threshold. In other examples, the system can apply a temporary manual adjustment (e.g., synthetic scenarios, user manipulated environment) to the digital twin network for introducing abnormal elements (e.g., service feature failure, security vulnerabilities, and/or the like) to runtime configurations of one or more synthetic network services. As a result, the system enables external users (e.g., administrative staff, authorized maintenance users, and/or the like) to evaluate results of hypothetical perturbations and/or custom environments applied to network services of the telecommunications.

Advantages of the disclosed system include a robust process for building and emulating network services for a virtual world environment, such as by leveraging statistical inference algorithms (e.g., generative machine learning models) to translate between user activities from a virtual world and network services of a telecommunications network. Furthermore, the disclosed technology can enable users to deploy synthetic scenarios (e.g., a widespread outage, erroneous service features, security vulnerabilities) at the digital twin network to evaluate downstream effects of the reference system without incurring significant disruptions and/or damages to real-world infrastructure.

For illustrative purposes, some examples of systems and methods are described herein in the context of generating and operating a digital twin network (e.g., synthetic network services) of a telecommunications network (e.g., actual network services) for virtual world environments. However, a person skilled in the art will appreciate that the disclosed system can be applied in other contexts. As an example, the disclosed system can be used within quality control management systems (e.g., manufacture production processes, urban traffic management, transportation fleet organization, and/or the like) to generate modular, and self-improving, synthetic auxiliary models of real-world systems and/or processes.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail to avoid unnecessarily obscuring the descriptions of examples.

Wireless Communications System

FIG. 1 is a block diagram that illustrates a wireless telecommunication network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, internet protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The coverage area 112 for a base station 102 can be divided into sectors making up only a portion of the coverage area (not shown). The network 100 can include base stations of different types (e.g., macro and/or small cell base stations). In some implementations, there can be overlapping coverage areas 112 for different service environments (e.g., Internet of Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term "eNBs" is used to describe the base stations 102, and in 5G new radio (NR) networks, the term "gNBs" is used to describe the base stations 102 that can include mmW communications. The network 100 can thus form a hetero-geneous network 100 in which different types of base stations provide coverage for various geographic regions. For example, each base station 102 can provide communi-cation coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geo-graphic area (e.g., several kilometers in radius) and can allow access by wireless devices that have service subscrip-tions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that oper-ate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establish-ment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the network 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provide data to a remote server over a network; IoT devices such as wirelessly connected smart home appliances; etc.

A wireless device (e.g., wireless devices 104) can be referred to as a user equipment (UE), a customer premises equipment (CPE), a mobile station, a subscriber station, a mobile unit, a subscriber unit, a wireless unit, a remote unit, a subscriber unit, a wireless unit, a remote unit, a handheld mobile device, a remote device, a mobile sub-scriber station, a terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in net-work 100 include uplink (UL) transmissions from a wireless device 104 to a base station 102 and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead infor-mation, user data, etc. The communication links 114 can transmit bidirectional communications using frequency divi-sion duplex (FDD) (e.g., using paired spectrum resources) or time division duplex (TDD) operation (e.g., using unpaired spectrum resources). In some implementations, the commu-nication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

In some examples, the network 100 implements 6G technologies including increased densification or diversifi-cation of network nodes. The network 100 can enable terrestrial and non-terrestrial transmissions. In this context, a Non-Terrestrial Network (NTN) is enabled by one or more satellites, such as satellites 116-1 and 116-2, to deliver services anywhere and anytime and provide coverage in areas that are unreachable by any conventional Terrestrial Network (TN). A 6G implementation of the network 100 can support terahertz (THz) communications. This can support wireless applications that demand ultrahigh quality of ser-vice (QoS) requirements and multi-terabits-per-second data transmission in the era of 6G and beyond, such as terabit-per-second backhaul systems, ultra-high-definition content streaming among mobile devices, AR/VR, and wireless high-bandwidth secure communications. In another example of 6G, the network 100 can implement a converged Radio Access Network (RAN) and Core architecture to achieve Control and User Plane Separation (CUPS) and achieve extremely low user plane latency. In yet another example of 6G, the network 100 can implement a converged Wi-Fi and Core architecture to increase and improve indoor coverage.

System Overview

FIG. 2 is a block diagram that illustrates a modular synthetic modeling system 200 ("system 200") that can implement aspects of the present technology. The components shown in FIG. 2 are merely illustrative, and well-known components are omitted for brevity. As shown, the computing server 202 includes a processor 210, a memory 220, a wireless communication circuitry 230 to establish wireless communication and/or information channels (e.g., Wi-Fi, internet, APIs, communication standards) with other computing devices and/or services (e.g., servers, databases, cloud infrastructure), and a display 240 (e.g., user interface). The processor 210 can have generic characteristics similar to general-purpose processors, or the processor 210 can be an application-specific integrated circuit (ASIC) that provides arithmetic and control functions to the computing server 202. While not shown, the processor 210 can include a dedicated cache memory. The processor 210 can be coupled to all components of the computing server 202, either directly or indirectly, for data communication. Further, the processor 210 of the computing server 202 can be communicatively coupled to a computing database 204 that is hosted alongside the computing server 202 on the core network 106 described in reference to FIG. 1. As shown, the computing database 204 can include a user profiles database 250, a modality configuration database 260, a service configuration database 270, and a machine learning models 280 database.

The memory 220 can comprise any suitable type of storage device including, for example, a static random-access memory (SRAM), dynamic random-access memory (DRAM), electrically erasable programmable read-only memory (EEPROM), flash memory, latches, and/or registers. In addition to storing instructions that can be executed by the processor 210, the memory 220 can also store data generated by the processor 210 (e.g., when executing the modules of an optimization platform). In additional, or alternative, embodiments, the processor 210 can store temporary information onto the memory 220 and store long-term data onto the computing database 204. The memory 220 is merely an abstract representation of a storage environment. Hence, in some embodiments, the memory 220 comprises one or more actual memory chips or modules.

As shown in FIG. 2, modules of the memory 220 can include a signal detection module 222, a service translation module 224, a network adjustment module 226, and a synthetic configuration module 228. Other implementations of the computing server 202 include additional, fewer, or different modules or distribute functionality differently between the modules. As used herein, the term "module" refers broadly to software components, firmware components, and/or hardware components. Accordingly, the modules 222, 224, 226, 228 could each comprise software, firmware, and/or hardware components implemented in, or accessible to, the computing server 202.

Figure 3:
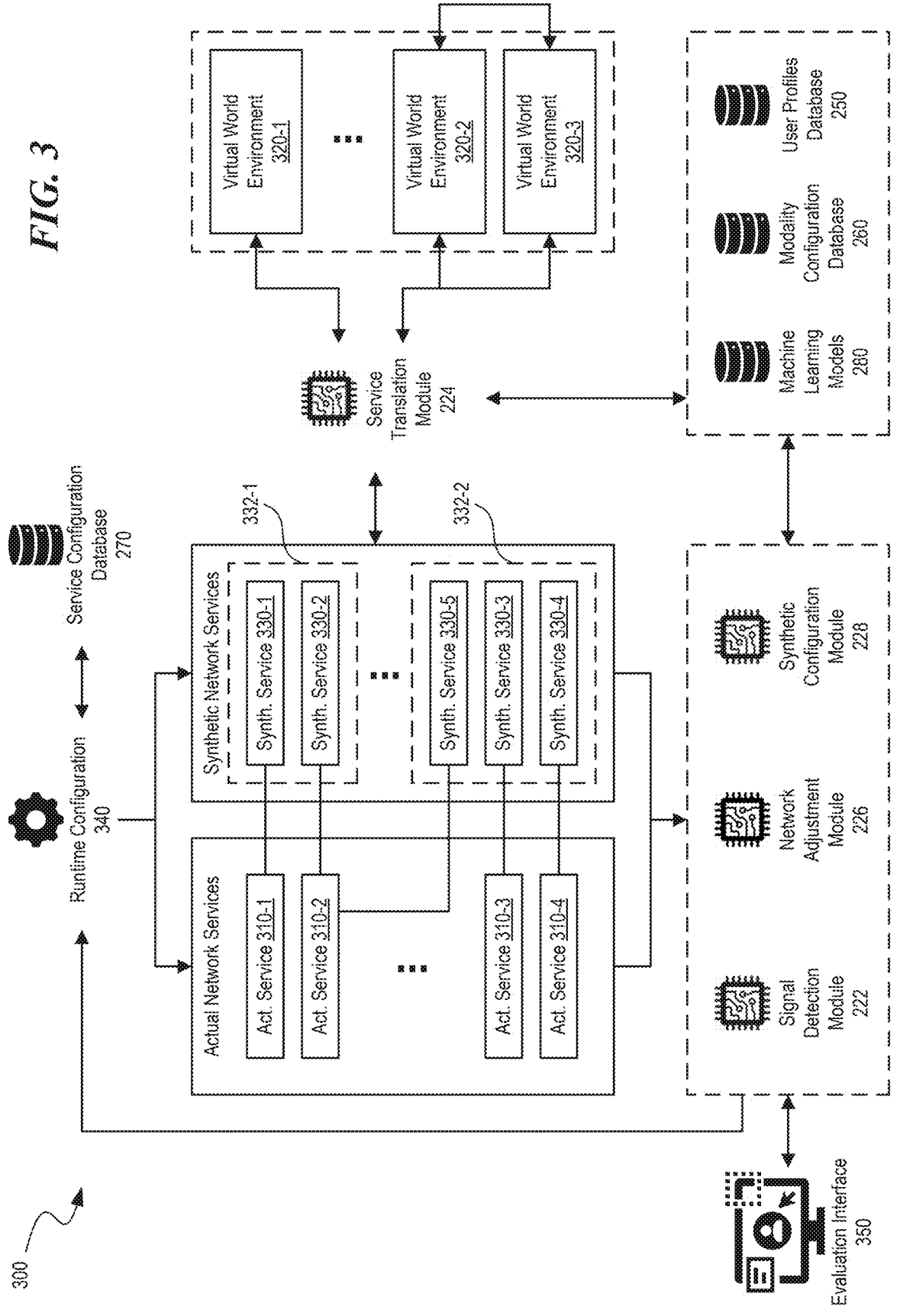
FIG. 3 is a block diagram that illustrates example processes of a modular synthetic modeling system in accordance with some implementations of the present technology.

FIG. 3 is a block diagram that illustrates example processes 300 of a modular synthetic modeling system 200 ("system 200") in accordance with some implementations of the present technology. As described herein, and throughout this document, the system 200 can include hardware components and computer-executable code that are configured to build and operate a digital twin (e.g., a virtual representation, a simulation, and/or the like) network model of a real, or actual, telecommunications network that emulates realistic network services for virtual world environments. As shown, one or more of the processes 300 can be performed using components of the system 200, including the signal detection module 222, the service translation module 224, the network adjustment module 226, the synthetic configuration module 228, the user profiles database 250, the modularity configuration database 260, the service configuration database 270, and the machine learning models 280 database. In some implementations, the components of system 200 can be configured to include, and/or utilize (e.g., via application programming interfaces (APIs)), actual network services 310-1 through 310-4 of a real-world telecommunications network, virtual world environments 320-1 through 320-3 (also referred to as "virtual world environment 320," "virtual worlds 320," and "virtual spaces 320"), synthetic network services 330-1 through 330-4 of digital twin networks 332-1, 332-2, a runtime configuration 340, and an evaluation interface 350. In other implementations, one or more components of the system 200 can be accessible to one or more external users (e.g., subscribing network users, authorized maintenance staff, and/or the like) who can utilize components of the modular synthetic modeling system 200. In an example, the signal processing system 102 is implemented using components of the example computer system 700 illustrated and described in more detail with reference to FIG. 7. Likewise, implementations of the example processes 300 of the modular synthetic modeling system 200 can include different and/or additional components or can be connected in different ways.

A virtual world environment 320 is a computer-simulated digital space (e.g., virtual reality, augmented reality, and/or the like) that enables participant users (e.g., subscribing users of the virtual world) to interact and engage with synthetic entities of the simulated world, such as objects, visuals, and other players (e.g., virtual avatars). In some implementations, a collection of multiple virtual world environments 320 can be combined to generate an interconnected virtual space (e.g., a metaverse, a gaming hub, and/or the like) that enables participant users from different virtual worlds to interact and communicate with each other. As shown in FIG. 3, the system 200 can be communicatively coupled (e.g., via an application programming interface (API)) to process data received from an individual virtual world environment 320-1 or a plurality of interconnected virtual world environments 320-2, 320-3.

A subscribing user of a virtual world environment 320 represents a real participant of a digital application or service (e.g., a social media, a video game, and/or the like) that is hosted via the virtual space 320. As an illustrative example, an external subscribing user can use specialized hardware and/or software (e.g., a web platform, a virtual reality headset, and/or the like) for connecting to, and/or immersing within, a virtual world environment 320. In some implementations, a subscribing user of a virtual world 320 can be assigned a virtual user identifier (e.g., a numerical code, an address signature, a property of a virtual avatar, and/or the like) that distinguishes the user from other participant users of the virtual world 320.

Within a virtual world 320, the subscribing user (e.g., via a custom avatar) can directly engage with synthetic interactable elements (e.g., an object, a screen interface, another user avatar, and/or the like) to invoke specific actions. For example, subscribing users of a communal virtual space 320 can use built-in interactive tools (e.g., an embedded chat message system, a voice call feature, and/or the like) to communicate with other subscribing users. Actions that are performed, or invoked, by subscribing users can be configured to include contextual metadata information that describes a state of the virtual world environment 320 (e.g., associated with invocation of the action). As an illustrative example, a communicative action (e.g., sending a text message) invoked by a subscribing user while in a mobile state can include metadata information for local movement parameters of the user (e.g., a velocity component of user avatar). Other examples of context parameters associated with a state of the virtual world environment 320 can include a timestamp (e.g., at invocation of action), a position (e.g., relative location), a user interface element (e.g., used to invoke action), and/or additional local environment parameters relevant to the user action.

As shown in FIG. 3, the system 200 can create a digital twin network 332 (e.g., a digital replica) that simulates one or more actual network services 310 (e.g., network features implemented via physical infrastructure) of a real-world telecommunications network. In particular, the system 200 can create a set of synthetic network services 330 (e.g., self-executing software programs) for the digital twin network 332 that emulates functional processes (e.g., network service nodes, features, and/or the like) of the actual network services under simulated real-world network conditions (e.g., network traffic, bandwidth constraints, packet loss, and/or the like). As depicted in FIG. 3, the system 200 can generate a synthetic network service 330-1 that mirrors functionality of the reference actual network service 310-1. In particular, the system 200 can configure the runtime configuration 340 (e.g., operational source code, hardware emulation parameters, and/or the like) of the synthetic network service 330-1 to be similar to the runtime configuration 340 of the reference actual network service 310-1. In some implementations, the system 200 can generate a plurality of synthetic network services 330-2, 330-5 that are configured to mirror functionality of the same reference actual network service 310-2. Accordingly, the system 200 can generate a plurality of digital twin networks 332-1, 332-2 that comprise similar, or identical, synthetic network services 330-2, 330-5. The system can store the runtime configuration of the actual network services 310, the synthetic network services 330, or both at the service configuration database 270.

In some implementations, the system 200 can configure the synthetic network service 330 (e.g., or the actual network service 310) of the digital twin network 332 (e.g., or real telecommunications network) to directly interact with the reference actual network service 310 (e.g., or the synthetic network service). As an example, the system 200 can configure a synthetic network service 330 to invoke executions for one or more network service features at the reference actual network service 310, serving as a communicative relay (e.g., an API) between the actual network service 310 and network requesting services and/or applications. In other implementations, the system 200 can configure a combination of synthetic network services 330 and actual network services 310 to execute hybrid network service features. As an example, a synthetic network service 330 can transmit data from a virtual world environment 320 to an actual network service 310 of a telecommunications network that is displayed at a user interface of a subscribed user of the telecommunications network. In other implementations, the system 200 can configure the synthetic network service 330 to include a required data schema format (e.g., a formatting object, a set of compliance rules, and/or the like) of data transmitted via the network service. In particular, the system 200 can generate the data schema format for the synthetic network service 330 based on a similar, or identical, required data schema format for transmitting data via the reference actual network service 310.

In some implementations, the system 200 can incrementally adjust (e.g., iterative training) runtime configuration of synthetic network services 330 of a digital twin network 332 to obtain comparable performance (e.g., of the synthetic network services 330) to actual network services 310 of a telecommunications network. As an example, the system 200 can retrieve real-time performance data samples for observed (e.g., via signal probes, software listeners, and/or the like) user network activities (e.g., text-based messaging, voice call communications, data transfers, and/or the like) facilitated via actual network services 310 of the telecommunications network. An individual data sample can comprise a data payload (e.g., contents of a text message, audio signals for voice call, machine-readable data, and/or the like) and a time-series measurement (e.g., a timestamped log) of key performance indicators (KPIs) (e.g., congestion, coverage, drop, throughput, power consumption, load-balance equity, interference, and/or the like) for the actual network service used to transmit the data payload (e.g., to a recipient user, a destination network service, and/or the like).

Using the real-time performance data samples, the system 200 can deploy a synthetic evaluation item (e.g., a unit test case) that replicates the transmission (e.g., and associated initial conditions) of the data payload via a synthetic network service 330 corresponding to the actual network service 310. Accordingly, the system 200 can also monitor, and generate, a time-series measurement of the same, or similar, measured KPIs (e.g., of the actual network service) for the synthetic network service. By comparing the time-series measurements of the actual and the synthetic network services, the system 200 can determine a performance similarity score (e.g., a numerical value, a categorical item, and/or the like) that indicates an approximate proficiency of the synthetic network service in emulating functions (e.g., behavioral patterns) of the actual network service. In response to the performance similarity score exceeding a similarity tolerance threshold (e.g., a predetermined static value, a dynamic adjusted value, and/or the like), the system 200 can generate, and apply, a corrective adjustment to the runtime configuration of the synthetic network service. In particular, the system 200 can apply a corrective adjustment that causes runtime performance (e.g., the measured KPIs) of the synthetic network service to match (e.g., within an acceptable threshold) the runtime performance of the actual network service. In some implementations, the corrective adjustments can include an addition of new network service features (e.g., cell towers, routers, and/or the like), a removal of network service features, a temporary pause (e.g., a service outage, a restart cycle, and/or the like) of network service features, an adjustment to network service parameters (e.g., tolerance thresholds, algorithmic service protocols, and/or the like), an update to prior configuration versions (e.g., a rollback), modifications based on standardized algorithms (e.g., laws of the standard algorithms, telecommunications standards, and/or the like), and/or additional operations of a self-organizing network (SON) (e.g., self-configuration, self-optimization, self-healing, self-protection, and/or the like). In additional or alternative implementations, the system 200 can be configured to iteratively repeat one or more of the processes (e.g., corrective adjustments) described herein until a termination condition is satisfied, such as when the performance similarity score is within an acceptable threshold (e.g., indicating comparable performance).

As shown in FIG. 3, the system 200 can communicatively couple (e.g., via APIs) synthetic network services 330 of a digital twin network 332 and virtual world environments 320 to facilitate realistic processing of communications data that originate from the virtual world 320. For example, the service translation module 224 of the system 200 can be configured to map submissible data types (e.g., structured data, API payloads, and/or the like) of the virtual world environment 320 to relevant synthetic network services 330 for processing each data type. For a submissible data type originating from the virtual world environment 320, the service translation module 224 can identify network services of the telecommunications network with required data schema formats that are satisfied by the submissible data type (e.g., compliant). In some implementations, the service translation module 224 can use predictive machine learning models 280 (e.g., statistical inference algorithms, generative machine learning models, and/or the like) to identify relevant network services of the telecommunications network, including network services with data schema formats that are not satisfied by the submissible data type (e.g., noncompliant). As an illustrative example, the service translation module 224 can prompt a generative machine learning model (e.g., large language model) to generate a response comprising one or more network services of the telecommunications network with high content similarity (e.g., cosine similarity, Euclidean distance, token embedding analysis, and/or the like) to the data payload type. Accordingly, the service translation module 224 can generate a mapping between the submissible data type of a virtual world environment 320 to the identified network services capable of transmitting the specified data type. Using the generated mappings for the submissible data types, the service translation module 224 can further generate a configuration object (e.g., a JSON object, a stored data structure, and/or the like) that associates the submissible data types of the virtual world environment 320 to compatible network service modalities (e.g., available network services) of a digital twin network 332. In some implementations, the service translation module 224 can store the configuration object at the modality configuration database 260.

In some implementations, the service translation module 224 can generate a second configuration object that associates submissible data types of additional (e.g., a second) virtual world environments 320 to compatible service modalities of a digital twin network 332. In some examples, when the additional virtual world environments 320 are linked to the same digital twin network 332, the mappings (e.g., between submissible data types and available network services) of the configuration objects can be consolidated (e.g., combined) into a singular configuration object. In additional or alternative implementations, the service translation module 224 can generate a second configuration object that associates the submissible data types, or a subset thereof, of the same virtual world environment 320 to compatible service modalities of multiple digital twin networks 332. As an illustrative example of FIG. 3, the service translation module 224 can map distinct sets of submissible data types originating from a single virtual world environment 320-1 to synthetic network services 330-1, 330-3 of multiple digital twin networks 332-1, 332-2.

In some implementations, the service translation module 224 can assign required contextual metadata information of the virtual world environment 320 for invoking, or executing, a synthetic network service 330 of a digital twin network 332. For example, the service translation module 224 can receive (e.g., from a virtual world 320 configuration, an external user configuration, and/or the like) a list of available context parameters, or variables, capable of describing unique states of the virtual world environment 320. For a given pair of a submissible data type of the virtual world 320 and a network service (e.g., actual or synthetic) of the telecommunications network, the service translation module 224 can determine a set of relevant, or required, context parameters for invoking the network service to transmit data of the submissible data type. As an example, the service translation module 224 can receive (e.g., via a user interface) a predetermined set of required context parameters from an authorized user (e.g., a maintenance staff, a verified user, and/or the like). In another example, the service translation module 224 can use a generative machine learning model (e.g., large language model) to identify relevant context parameters, or context parameters associated with a relevant state of the virtual world 320, for the required data schema of the network service.

In some implementations, the system 200 can process data transmission requests from a virtual world environment 320 via synthetic network services 330 of a digital coupled digital twin network 332. For example, the system 200 can receive (e.g., via an API) a user (e.g., subscribing user of virtual world 320) initiated request for transmitting communications data (e.g., text, audio, and/or the like) via the digital twin network. The user request from the virtual world 320 can include a virtual user identifier, a payload (e.g., raw and/or structured data) of a submissible data type, and/or a set of metadata context parameters associated with the virtual world environment 320 (e.g., a state of the virtual world 320). In some implementations, the user request can further comprise a recipient user identifier (e.g., a destination identifier) that identifies a subscribing user of the telecommunications network to receive the payload of the submissible data type. In some examples, the recipient user identifier can be associated with a separate virtual world environment 320 from the source virtual world environment 320 of the user request.

In some implementations, the system 200 can use a virtual user identifier of a received user request to identify a relevant subscribing user of the telecommunications network. For example, the service translation module 224 can access (e.g., from the user profiles database 250, an identity access management (IAM), and/or the like) interrelated user profiles (e.g., profiles corresponding to a same and/or related identity) of subscribing users within virtual world environments 320 and the telecommunications network via mappings between virtual user identifiers and network user identifiers. A network user identifier of a subscribing user of the telecommunications network can comprise a Mobile Station International Subscriber Directory Number (MSISDN), an International Mobile Subscriber Identity (IMSI), an International Mobile Equipment Identity (IMEI), an Integrated Circuit Card Identifier (ICCID), a Temporary Mobile Subscriber Identity (TMSI), and/or a Globally Unique Temporary Identifier (GUTI).

In some implementations, the system 200 can use a network user identifier corresponding to a virtual user identifier of a user request to select an appropriate synthetic network service 330 of a digital twin network 332 for transmitting data. For example, the service translation module 224 can use the network user identifier to access (e.g., from the modality configuration database 260) a portion of the service modality configuration (e.g., corresponding to a subscribing user) for the digital twin network 332 that maps submissible data types (e.g., available and/or accessible to a subscribing user) to a set of synthetic network services 330 (e.g., available and/or accessible to a subscribing user) of the digital twin network 332. From the mapping, the service translation module 224 can select an available synthetic network service 330 for transmitting a data payload of the user request. In some implementations, the service translation module 224 can select an available synthetic network service 330 that comprises a required set of context parameters (e.g., of the virtual world environment 320) that is satisfied (e.g., inclusion of specific variables, meeting parameter thresholds, and/or the like) by the set of context parameters included in the received user request. Accordingly, the service translation module 224 can transmit the data payload of the user request (e.g., to a recipient user, a destination address, and/or the like) via the selected synthetic network service 330.

In some implementations, the system 200 can use a network user identifier corresponding to a virtual user identifier to determine additional synthetic network services 330 for transmitting data. For example, the service translation module 224 can use the network user identifier to determine (e.g., from the user profiles database 250) a set of actual network services previously used (e.g., in a time interval, at a certain frequency, and/or the like) by the subscribing user of the telecommunications network. From the set of prior actual network services, the service translation module 224 can identify actual network services 310 capable of transmitting the data payload type of the user request. For example, the service translation module 224 can prompt a generative machine learning model (e.g., large language model) to generate a response identifying at least one actual network service 310 that comprises required data schema formats with content similarities to the data payload of the user request. Accordingly, the service translation module 224 can identify (e.g., from the modality configuration database 260, the service configuration database 270, and/or the like) at least one synthetic network service 330 that corresponds to the identified at least one actual network service 310. In response to an absence of the at least one synthetic network service 330 from the service modality configuration for the network user identifier, the service translation module 224 can add, and/or utilize, the at least one synthetic network service 330 as an available synthetic network service 330 for transmitting the data payload.

In some implementations, the system 200 can modify a data payload of a user request prior to transmitting the data via a selected synthetic network service 330. For example, the service translation module 224 can evaluate compliance of the data payload with required data schema formats of the selected synthetic network service 330. In response to the data payload failing to satisfy the required data schema formats (e.g., a missing variable, an incorrect structure, and/or the like), the service translation module 224 can translate and/or transform contents of the data payload into a format that meets the data schema requirements (e.g., conversion of instant messaging contents to transmissible packet data). For example, the service translation module 224 can prompt a generative machine learning model (e.g., large language model), and/or other machine learning models 280, to generate a modified version of the data payload that satisfies the data schema formats.

In some implementations, the system 200 can configure a presentation formatting (e.g., at a user interface) for data transmitted via synthetic network services 330. For example, the service translation module 224 can use a recipient user identifier of the user request to access (e.g., from the user profiles database 250) a portion of the service modality configuration for the digital twin network 332 that maps synthetic network services 330 to a set of available data presentation formats (e.g., of transmitted data payloads) at a user interface associated with the recipient user identifier. From the mapping, the service translation module 224 can select an available data format (e.g., using custom interface elements, presentation flows, dynamic elements, and/or the like) for presenting the transmitted data payload of the user request. In some implementations, the service translation module 224 can select an available data presentation format that is associated with a required set of context parameters (e.g., of the virtual world environment 320) that is satisfied (e.g., inclusion of specific variables, meeting parameter thresholds, and/or the like) by the set of context parameters included in the received user request. Accordingly, the service translation module 224 can configure contents of the data payload of the user request to be presented in the selected data format at the recipient user interface of a destination virtual world environment 320.

In some implementations, the system 200 can apply adjustments (e.g., via iterative improvement) to actual network services 310 of a telecommunications network based on monitored performance of synthetic network services 330 of a digital twin network 332. For example, the signal detection module 222 can actively monitor (e.g., via real-time network service probes) KPIs of active synthetic network services 330 (e.g., services transmitting data) of a digital twin network 332. In response to a monitored KPI of a synthetic network service 330 exceeding an assigned (e.g., or dynamic) tolerance threshold, the network adjustment module 226 can identify a runtime configuration 340 of the synthetic network service 330 that is responsible for, or associated with the cause of, the abnormal performance of the monitored KPI. Accordingly, the network adjustment module 226 can generate a corrective adjustment to the runtime configuration 340 of the synthetic network service 330 to cause runtime performance of the monitored KPI to be within the tolerance threshold. Additionally, the network adjustment module 226 can identify a second runtime configuration 340 of an actual network service 310 that corresponds to the synthetic network service 330. As a result, the network adjustment module 226 can also apply the same, or similar, corrective adjustment to the second runtime configuration 340 of the actual network service 310. In additional or alternative implementations, the network adjustment module 226 can store modifications to the runtime configurations 340 (e.g., of the actual/synthetic network services) at the service configuration database 270, including versions of the runtime configurations 340 prior to and/or after applying the modifications. In further implementations, the signal detection module 222 can be configured to report monitored KPIs (e.g., of actual/synthetic network services) to an evaluation interface 350 accessible to authorized users (e.g., maintenance staff, verified developers, and/or the like).

In some implementations, the system 200 can apply adjustments (e.g., via iterative improvement) to synthetic network services 330 of a digital twin network 332 based on monitored performance of actual network services 310 of a telecommunications network. For example, the signal detection module 222 can actively monitor (e.g., via real-time network service probes) KPIs of active actual network services 310 (e.g., services transmitting data) of a telecommunications network. In response to a monitored KPI of an actual network service 310 exceeding an assigned (e.g., or dynamic) tolerance threshold, the network adjustment module 226 can identify a runtime configuration 340 of the actual network service 310 that is responsible for, or associated with the cause of, the abnormal performance of the monitored KPI. Accordingly, the network adjustment module 226 can generate a corrective adjustment to the runtime configuration 340 of the actual network service 310 to cause runtime performance of the monitored KPI to be within the tolerance threshold. Additionally, the network adjustment module 226 can identify a second runtime configuration 340 of a synthetic network service 330 that corresponds to the actual network service 310. As a result, the network adjustment module 226 can also apply the same, or similar, corrective adjustment to the second runtime configuration 340 of the synthetic network service 330. In additional or alternative implementations, the network adjustment module 226 can store modifications to the runtime configurations 340 (e.g., of the actual/synthetic network services) at the service configuration database 270, including versions of the runtime configurations 340 prior to and/or after applying the modifications. In further implementations, the signal detection module 222 can be configured to report monitored KPIs (e.g., of actual/synthetic network services) to an evaluation interface 350 accessible to authorized users (e.g., maintenance staff, verified developers, and/or the like).

In some implementations, the system 200 can evaluate KPIs of synthetic network services 330 (e.g., or actual network services 310) to a dynamic tolerance threshold. For example, the system 200 can determine a dynamic tolerance threshold of monitored KPIs based on relative consumption frequencies and/or rates for actual network services 310 and corresponding synthetic network services 330. In this example, the system 200 can determine a first service consumption rate (e.g., a quantity, a percentage, a rate of change, and/or the like) of a synthetic network service 330 that represents an approximate usage of the synthetic network service 330 by subscribing users of a virtual world environment 320. The system 200 can also determine a second service consumption rate of an actual network service 310 corresponding to the synthetic network service 330 that represents approximate usage of the actual network service 310 by subscribing users of a telecommunications network. Using the first and the second service consumption rates, the system 200 can calculate an approximate equivalence factor (e.g., a ratio, a numerical multiplier, and/or the like) that scales the first service consumption rate to match the second service consumption rate, or vice versa. Accordingly, the system 200 can adjust the tolerance threshold of monitored KPIs for the synthetic network services 330 and/or the corresponding actual network services 310 using the equivalence factor.

In some implementations, the system 200 can simulate (e.g., synthetic) custom configurations and/or states for synthetic network services 330 of a digital twin network 332. For example, the synthetic configuration module 228 can receive (e.g., via the evaluation interface 350 of an authorized user) a temporary manual adjustment of one or more runtime configurations 340 for target synthetic network services 330 of a digital twin network 332. In some implementations, the temporary manual adjustment can include modifications to runtime configuration 340 elements that cause a termination of network service features (e.g., a shutdown of critical services, a restart of network features, and/or the like), an embedding of erroneous network services features (e.g., erroneous source code), a security vulnerability of network service features (e.g., malicious executable programs), and/or additional functions for manipulating the digital twin network 332. In response to application of the temporary adjustment, the signal detection module 222 can actively monitor (e.g., in real time) one or more KPIs for the target synthetic network services 330. Accordingly, the signal detection module 22 can be configured to display (e.g., at the evaluation interface 350) a real-time performance report of the monitored KPIs for the target synthetic network services 330. In additional or alternative implementations, the system 200 can be configured to generate (e.g., via a generative machine learning model) a set of recommended correction adjustments that cause runtime performance of the monitored KPIs to be within a target tolerance threshold. As a result, the system 200 can display (e.g., at the evaluation interface 350) the set of recommended correction adjustments alongside the real-time performance report. A person with reasonable skill in the art will recognize and appreciate the foregoing features and/or operations of the system 200 that enable external authorized users to execute and evaluate potentially disruptive (e.g., nonfunctioning, erroneous, vulnerable, and/or the like) runtime variations of the digital twin network 332 to obtain insights and/or impacts (e.g., service continuity, troubleshooting, resiliency, and/or the like) regarding the real telecommunications network at significantly reduced risk of damages.

FIG. 4 is a flow diagram that illustrates a process to generate a digital twin network in some implementations. The process 400, or method, can be performed by a system (e.g., modular synthetic modeling system 200) configured to create, or build, synthetic network services (e.g., an executable software, a simulated service, and/or the like) that represent and emulate similar, or identical, functions of actual network services of a telecommunications network. In one example, the system includes at least one hardware processor and at least one non-transitory memory storing instructions, which, when executed by the at least one hardware processor, cause the system to perform the process 400. In another example, the system includes a non-transitory, computer-readable storage medium comprising instructions recorded thereon, which, when executed by at least one data processor, cause the system to perform the process 400.

At 402, the system can identify a set of actual network services (e.g., voice communication, data transfer, messaging services, multimedia services, mobile services, network management, and/or the like) of a telecommunications network. For example, the system can determine one or more actual network services such that each actual network service comprises a required data schema format for transmitting data (e.g., a data payload) via the network service. In some implementations, the system can access the set of actual network services from a remote database comprising runtime configuration information of network services of the telecommunications network.

At 404, the system can determine suitable network services for processing types of data payloads (e.g., text messages, audio signals, communication data, and/or the like) that originate from a virtual world environment (e.g., a metaverse, a computer-simulated environment, and/or the like). In particular, the system can determine a set of network services of the telecommunications network that are available, or relevant, for processing each submissible (e.g., from the virtual world environment) data payload type. For example, the system can identify a set of compliant network services from the set of actual network services such that the data payload type satisfies the required data schema format for each compliant network service in the identified set.

At 406, the system can determine a set of non-compliant network services from the set of actual network services that correspond to required data schema formats with high content similarity to the data payload type. For example, the system can prompt a generative machine learning model to identify a set of network services from the set of actual network services that comprise data schema formats with content similarities (e.g., a data field type, a specified information type, and/or the like). In some implementations, the system can determine the set of non-compliant network services where the data payload type fails to satisfy the required data schema format for each non-compliant network service.

At 408, the system can assign necessary context parameters associated with the virtual world environment for transmitting the data payload via a specified network service. For example, the system can assign a set of required context parameters for each network service from the set of compliant network services and the set of non-compliant network services. In some implementations, the necessary context parameters associated with the virtual world environment comprise a location, a timestamp, a set of movement parameters for entities of the virtual world environment, a set of local environment parameters, a specified network service feature, a set of accessible user interface elements, or a combination thereof.

At 410, the system can generate a service modality configuration that maps each submissible data payload type of the virtual world environment to a set of available network services of the telecommunications network. For example, the system can generate the set of available network services based on a combination of network services from the set of compliant network services and the set of non-compliant network services. Accordingly, the system can generate the service modality configuration that is configured to map each data payload type of the virtual world environment to each network service of the set of available network services.

In some implementations, the system can receive at least one virtual user identifier that corresponds to at least one subscribing user of the virtual world environment. Accordingly, the system can identify a network user identifier of a subscribing user of the telecommunications network that is associated with the at least one virtual user identifier of the virtual world environment. Using the network user identifier, the system can determine a set of prior network services used by the subscribing user of the telecommunications network. The system can further generate a second modality configuration that maps each submissible data payload type of the virtual world environment to a subset of available network services of the telecommunications network that are included in the set of prior network services.

At 412, the system can use the service modality configuration to create a digital twin network for the telecommunications network. For example, the system can use the mapping of data payload types to available network services to create a set of synthetic network services that correspond to the set of available network services. In particular, the system can generate a synthetic network service for each available network service such that the synthetic network service comprises a runtime configuration that is functionally similar (e.g., emulates similar network service features) to the runtime configuration of the corresponding available network service.

In some implementations, the system can incrementally (e.g., iteratively) adjust, and improve, performance of synthetic network services using real-time performance data samples from the available network services of the telecommunications network. For example, the system can receive real-time performance data samples such that each data sample comprises a source data payload (e.g., a user submitted data) and a first time-series measurement of at least one monitored KPI (e.g., measured performance over time interval) for an actual network service used to transmit the source data payload. Using an individual data sample from the real-time performance data samples, the system can identify a target synthetic network service of the digital twin network that corresponds to the actual network service used to transmit the data payload.

To emulate a synthetic processing of the data sample, the system can transmit a copy of the source payload via the target synthetic network service of the digital twin network. As an example, the system can use the service modality configuration to determine a required data schema for the source data payload of the target synthetic network service. When the source data payload does not satisfy the required data schema for the source data payload, the system can prompt a generative machine learning model to generate a modified data payload comprising translated contents of the source data payload that satisfy the required data schema. In response to transmitting the source payload via the target synthetic network service, the system can generate a second time-series measurement of the at least one monitored KPI for the target synthetic network service. By comparing the first and the second time-series measurements of the at least one monitored KPI, the system can determine a performance similarity score between the actual network service and the target synthetic network.

In additional or alternative implementations, the system can apply an adjustment to the runtime configuration of the target synthetic network in response to the performance similarity score exceeding a tolerance threshold. In particular, the system can apply an adjustment that causes runtime performance of the at least one monitored KPI for the synthetic network service to match the runtime performance of the at least one monitored KPI for the actual network service. In some implementations, the adjustment applied to the runtime configuration of the target synthetic network can comprise an addition of new network service features, a removal of network service features, a temporary pause of network service features, an adjustment to network service parameters, an update to a prior configuration version of the network service, operations of a self-organizing network (SON), modifications based on standardized algorithms, or a combination thereof.

In other implementations, the system can configure the digital twin network to process (e.g., via synthetic network services) data payload types of additional virtual network environments. In particular, the system can determine suitable network services for processing types of data payloads, or second data payload types, that originate from a second virtual world environment that is separate from the first virtual world environment. For example, the system can identify a second set of compliant network services from the set of actual network services such that the second data payload type satisfies the required data schema format for each compliant network service. The system can further determine (e.g., via a generative machine learning model) a second set of non-compliant network services from the set of actual network services that correspond to required data schema formats with high content similarity to the second data payload type. In some implementations, the system can determine the second set of non-compliant network services where the second data payload type fails to satisfy the required data schema format for each non-compliant network service. The system can also assign a second set of required context parameters (e.g., context parameters of the second virtual world environment that are available for submission with the second data payload type) for each network service from the set of compliant network services and the set of non-compliant network services. Accordingly, the system can update the service modality configuration to map each second data payload type of the second virtual world environment to a second set of available network services of the telecommunications network that comprises the second set of compliant network services and the second set of non-compliant network services.

In some implementations, the system can create additional digital twin networks of the telecommunications network to process data transmission and/or communications requests (e.g., user-initiated requests) of the virtual world environment. For example, the system can configure the digital twin network as a first digital twin network to execute a first set of user requests for transmitting data from the virtual world environment. The system can use the service modality configuration to create a second digital twin network including the set of synthetic network services of the first digital twin network that correspond to the set of available network services. Accordingly, the system can configure the second digital twin network to execute a second set of user requests for transmitting data from the virtual world environment.

Figure 5:
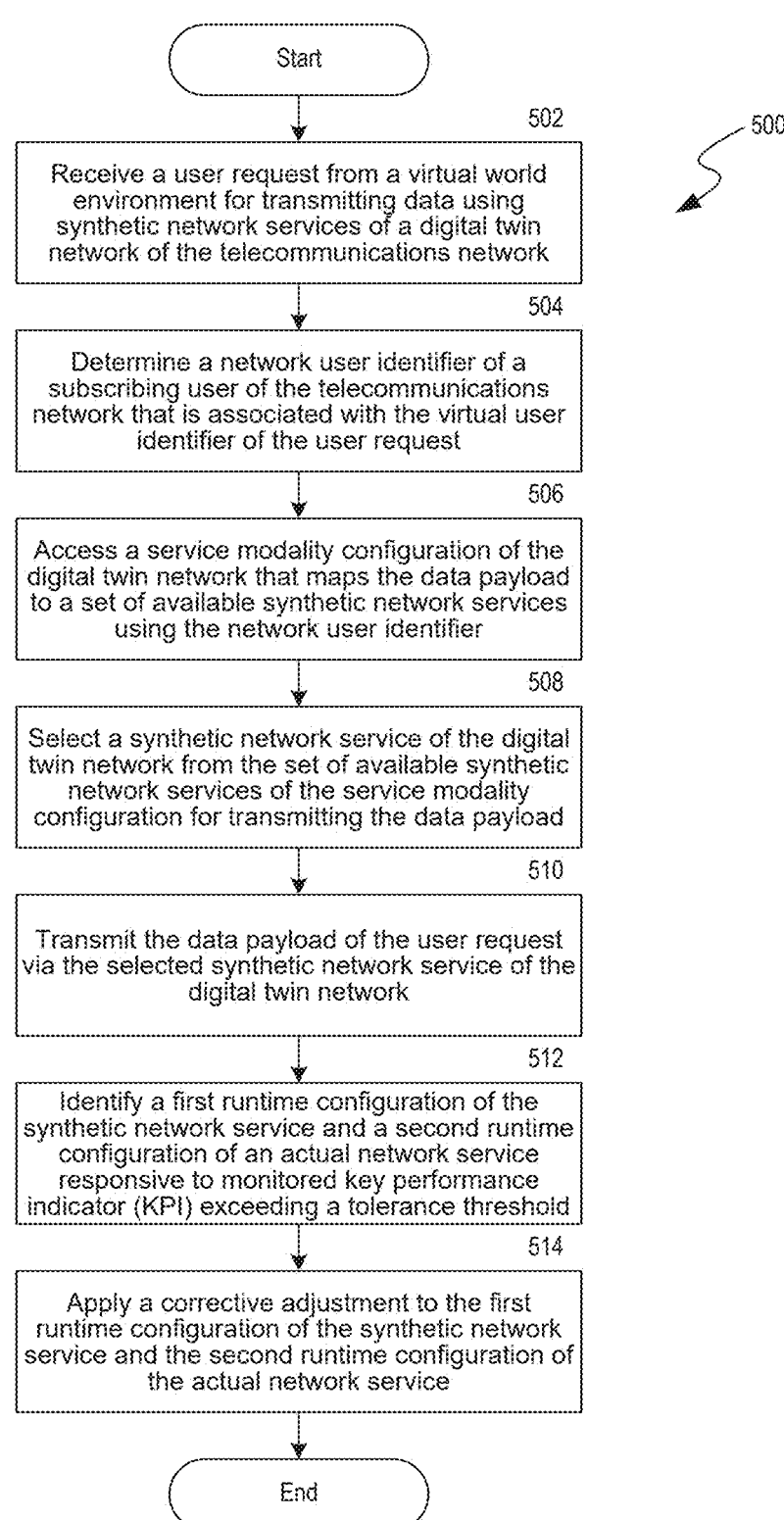
FIG. 5 is a flow diagram that illustrates a process to adjust a digital twin network in some implementations.

FIG. 5 is a flow diagram that illustrates a process to adjust a digital twin network in some implementations. The process 500, or method, can be performed by a system (e.g., modular synthetic modeling system 200) configured to generate corrective adjustments to runtime configurations of synthetic network services (e.g., of the digital twin network) based on performance analysis of network communication activities (e.g., a text message, a voice call, and/or the like). In one example, the system includes at least one hardware processor and at least one non-transitory memory storing instructions, which, when executed by the at least one hardware processor, cause the system to perform the process 500. In another example, the system includes a non-transitory, computer-readable storage medium comprising instructions recorded thereon, which, when executed by at least one data processor, cause the system to perform the process 500.

At 502, the system can receive (e.g., via an API) a user request from a virtual world environment for transmitting data using synthetic network services of a digital twin network of the telecommunications network. In some implementations, the system can receive a user request that comprises a virtual user identifier, a data payload, and a set of request context parameters associated with the virtual world environment. In other implementations, the system can receive a user request from the virtual world environment that comprises a recipient user identifier of a recipient subscribing user of the telecommunications network. In additional or alternative implementations, the set of request context parameters associated with the virtual world environment can comprise a location, a timestamp, a set of movement parameters for entities of the virtual world environment, a set of local environment parameters, a specified network service feature, a set of accessible user interface elements, or a combination thereof.

At 504, the system can determine a network user identifier of a subscribing user of the telecommunications network that is associated with the virtual user identifier of the user request from the virtual world environment. In some implementations, the network user identifier of the subscribing user of the telecommunications network can comprise a Mobile Station International Subscriber Directory Number (MSISDN), an International Mobile Subscriber Identity (IMSI), an International Mobile Equipment Identity (IMEI), an Integrated Circuit Card Identifier (ICCID), a Temporary Mobile Subscriber Identity (TMSI), a Globally Unique Temporary Identifier (GUTI), or a combination thereof.

At 506, the system can use the network user identifier to access a service modality configuration of the digital twin network that maps the data payload to a set of available synthetic network services. For example, the system can access a service modality configuration that maps data payloads, or data payload types, to at least one available synthetic network service that comprises a set of required context parameters associated with the virtual world environment.

In some implementations, the system can use the network user identifier to determine a set of actual network services previously used by the subscribing user of the telecommunications network. Using the set of actual network services, the system can prompt a generative machine learning model to identify at least one actual network service that comprises a required data schema relevant to contents of the data payload. Accordingly, the system can determine, from the digital twin network, at least one synthetic network service that corresponds to the identified at least one actual network service of the telecommunications network. In response to an absence of the at least one synthetic network service from the service modality configuration, the system can add the at least one synthetic network service to the set of available synthetic network services for transmitting the data payload.

At 508, the system can select a synthetic network service of the digital twin network for transmitting the data payload from the set of available synthetic network services of the service modality configuration such that the set of request context parameters of the user request satisfies the set of required context parameters of the selected synthetic network service and the synthetic network service of the digital twin network corresponds to an actual network service of the telecommunications network. In some implementations, the system can determine, from the service modality configuration, a required data schema for the data payload when transmitting via the selected synthetic network service of the digital twin network. In response to the data payload not satisfying the required data schema, the system can prompt a generative machine learning model to generate a modified data payload comprising translated contents (e.g., transformed from original format) of the data payload that satisfy the required data schema.

At 510, the system can transmit (e.g., via the selected synthetic network service of the digital twin network) the data payload of the user request, such as a recipient subscribing user of the virtual world environment or telecommunications network. For example, the system can present contents of the data payload of the user request at a user interface of the recipient subscribing user. In some implementations, the system can transmit the data payload of the user request to a recipient subscribing user of a second virtual world environment. For example, the system can determine the recipient user identifier of the user request as a second virtual user identifier of a second virtual world environment. Using the second virtual user identifier, the system can determine a second network user identifier (e.g., for the telecommunications network) of the recipient subscribing user that is associated with the second virtual user identifier. Further, the system can use the second virtual user identifier to identify a set of recipient context parameters (e.g., a current virtual world environment context for the recipient user) associated with the second virtual world environment. Using the second network user identifier, the system can access a second service modality configuration that maps the selected synthetic network service of the digital twin network to a set of available data formats of the data payload such that each available data format comprises a set of required context parameters associated with the second virtual world environment. The system can select, from the set of available data formats of the service modality configuration, a data format for presenting the data payload at the user interface of the recipient subscribing user such that the set of recipient context parameters satisfies the set of required context parameters of the selected data format. Accordingly, the system can configure the contents of the data payload of the user request to be presented at the user interface of the recipient subscribing user according to the selected data format.

At 512, the system can monitor at least one key performance indicator (KPI) for the selected synthetic network service of the digital twin network. In response to the at least one monitored KPI for the synthetic network service exceeding a tolerance threshold, the system can identify a first runtime configuration of the synthetic network service of the digital twin network and a second runtime configuration of the actual network service of the telecommunications network such that the first runtime configuration is associated with the at least one monitored KPI for the synthetic network service and the second runtime configuration is functionally similar (e.g., emulates similar network services features) to the first runtime configuration.

In some implementations, the system can determine, from the synthetic network service of the digital twin network, a first service consumption rate representative of approximate usage of the synthetic network service by subscribing users of the virtual world environment. Further, the system can determine, from the actual network service of the telecommunications network, a second service consumption rate representative of approximate usage of the network service by subscribing users of the telecommunications network. Accordingly, the system can use the first and the second service consumption rates to estimate an equivalence factor for scaling the first service consumption rate of the synthetic network service to match the second service consumption rate of the actual network service. In additional or alternative implementations, the system can adjust the tolerance threshold of the at least one monitored KPI for the synthetic network service based on the equivalence factor.

At 514, the system can apply a corrective adjustment to the first runtime configuration of the synthetic network service of the digital twin network such that the corrective adjustment causes runtime performance of the at least one monitored KPI to be within the tolerance threshold. In some implementations, the system can also apply the corrective adjustment to the second runtime configuration of the actual network service of the telecommunications network. In other implementations, the corrective adjustment applied to the first and the second runtime configurations can comprise an addition of new network service features, a removal of network service features, a temporary pause of network service features, an adjustment to network service parameters, an update to a prior configuration version of the network service, operations of a self-organizing network (SON), modifications based on standardized algorithms, or a combination thereof.

In some implementations, the system can monitor the at least one monitored KPI (e.g., of the synthetic network service) for the actual network service of the telecommunications network. In response to the at least one monitored KPI for the actual network service exceeding a second tolerance threshold, the system can identify a third runtime configuration of the actual network service of the telecommunications network and a fourth runtime configuration of the synthetic network service of the digital twin network such that the third runtime configuration is associated with the at least one monitored KPI for the actual network service and the fourth runtime configuration is functionally similar (e.g., emulates similar network services features) to the third runtime configuration. Accordingly, the system can apply a second corrective adjustment to the third runtime configuration of the actual network service of the telecommunications network such that the second corrective adjustment causes runtime performance of the at least monitored KPI of the actual network service to be within the second tolerance threshold. In additional or alternative implementations, the system can apply the second corrective adjustment to the fourth runtime configuration of the synthetic network service of the digital twin network.

In other implementations, the system can receive a temporary adjustment of runtime configurations for a set of target synthetic network services of the digital twin network from an authorized user via a user interface. For example, the system can receive a temporary adjustment that is configured to cause, for each target synthetic network service of the set of target synthetic network services, a termination of network service features, an embedding of erroneous network service features, a security vulnerability of network service features, or a combination thereof. In response to applying the temporary adjustment to the runtime configurations for the set of target synthetic network services, the system can monitor at least one target KPI for each target synthetic network service. Accordingly, the system can display (e.g., at the user interface) a real-time performance report of the monitored at least one target KPI for the set of target synthetic network services. In response to the monitored at least one target KPI for at least one target synthetic network service exceeding a target tolerance threshold, the system can further prompt a generative machine learning model to generate a set of recommended corrective adjustments for causing runtime performance of the at least one monitored KPI to be within the target tolerance threshold. The system can also display (e.g., at the user interface) the set of recommended corrective adjustments alongside the real-time performance report.

Transformer for Neural Network

To assist in understanding the present disclosure, some concepts relevant to neural networks and machine learning (ML) are discussed herein. Generally, a neural network comprises a number of computation units (sometimes referred to as "neurons"). Each neuron receives an input value and applies a function to the input to generate an output value. The function typically includes a parameter (also referred to as a "weight") whose value is learned through the process of training. A plurality of neurons may be organized into a neural network layer (or simply "layer") and there may be multiple such layers in a neural network. The output of one layer may be provided as input to a subsequent layer. Thus, input to a neural network may be processed through a succession of layers until an output of the neural network is generated by a final layer. This is a simplistic discussion of neural networks and there may be more complex neural network designs that include feedback connections, skip connections, and/or other such possible connections between neurons and/or layers, which are not discussed in detail here.

A deep neural network (DNN) is a type of neural network having multiple layers and/or a large number of neurons. The term DNN may encompass any neural network having multiple layers, including convolutional neural networks (CNNs), recurrent neural networks (RNNs), multilayer perceptrons (MLPs), Generative Adversarial Networks (GANs), Variational Autoencoders (VAEs), and Auto-regressive Models, among others.

DNNs are often used as ML-based models for modeling complex behaviors (e.g., human language, image recognition, object classification) in order to improve the accuracy of outputs (e.g., more accurate predictions) such as, for example, as compared with models with fewer layers. In the present disclosure, the term "ML-based model" or more simply "ML model" may be understood to refer to a DNN. Training an ML model refers to a process of learning the values of the parameters (or weights) of the neurons in the layers such that the ML model is able to model the target behavior to a desired degree of accuracy. Training typically requires the use of a training dataset, which is a set of data that is relevant to the target behavior of the ML model.

As an example, to train an ML model that is intended to model human language (also referred to as a language model), the training dataset may be a collection of text documents, referred to as a text corpus (or simply referred to as a corpus). The corpus may represent a language domain (e.g., a single language), a subject domain (e.g., scientific papers), and/or may encompass another domain or domains, be they larger or smaller than a single language or subject domain. For example, a relatively large, multilingual and non-subject-specific corpus may be created by extracting text from online webpages and/or publicly available social media posts. Training data may be annotated with ground truth labels (e.g., each data entry in the training dataset may be paired with a label), or may be unlabeled.

Training an ML model generally involves inputting into an ML model (e.g., an untrained ML model) training data to be processed by the ML model, processing the training data using the ML model, collecting the output generated by the ML model (e.g., based on the inputted training data), and comparing the output to a desired set of target values. If the training data is labeled, the desired target values may be, e.g., the ground truth labels of the training data. If the training data is unlabeled, the desired target value may be a reconstructed (or otherwise processed) version of the corresponding ML model input (e.g., in the case of an autoencoder), or can be a measure of some target observable effect on the environment (e.g., in the case of a reinforcement learning agent). The parameters of the ML model are updated based on a difference between the generated output value and the desired target value. For example, if the value outputted by the ML model is excessively high, the parameters may be adjusted so as to lower the output value in future training iterations. An objective function is a way to quantitatively represent how close the output value is to the target value. An objective function represents a quantity (or one or more quantities) to be optimized (e.g., minimize a loss or maximize a reward) in order to bring the output value as close to the target value as possible. The goal of training the ML model typically is to minimize a loss function or maximize a reward function.

The training data may be a subset of a larger data set. For example, a data set may be split into three mutually exclusive subsets: a training set, a validation (or cross-validation) set, and a testing set. The three subsets of data may be used sequentially during ML model training. For example, the training set may be first used to train one or more ML models, each ML model, e.g., having a particular architecture, having a particular training procedure, being describable by a set of model hyperparameters, and/or otherwise being varied from the other of the one or more ML models. The validation (or cross-validation) set may then be used as input data into the trained ML models to, e.g., measure the performance of the trained ML models and/or compare performance between them. Where hyperparameters are used, a new set of hyperparameters may be determined based on the measured performance of one or more of the trained ML models, and the first step of training (i.e., with the training set) may begin again on a different ML model described by the new set of determined hyperparameters. In this way, these steps may be repeated to produce a more performant trained ML model. Once such a trained ML model is obtained (e.g., after the hyperparameters have been adjusted to achieve a desired level of performance), a third step of collecting the output generated by the trained ML model applied to the third subset (the testing set) may begin. The output generated from the testing set may be compared with the corresponding desired target values to give a final assessment of the trained ML model's accuracy. Other segmentations of the larger data set and/or schemes for using the segments for training one or more ML models are possible.

Backpropagation is an algorithm for training an ML model. Backpropagation is used to adjust (also referred to as update) the value of the parameters in the ML model, with the goal of optimizing the objective function. For example, a defined loss function is calculated by forward propagation of an input to obtain an output of the ML model and a comparison of the output value with the target value. Backpropagation calculates a gradient of the loss function with respect to the parameters of the ML model, and a gradient algorithm (e.g., gradient descent) is used to update (i.e., "learn") the parameters to reduce the loss function. Backpropagation is performed iteratively so that the loss function is converged or minimized. Other techniques for learning the parameters of the ML model may be used. The process of updating (or learning) the parameters over many iterations is referred to as training. Training may be carried out iteratively until a convergence condition is met (e.g., a predefined maximum number of iterations has been performed, or the value outputted by the ML model is sufficiently converged with the desired target value), after which the ML model is considered to be sufficiently trained. The values of the learned parameters may then be fixed and the ML model may be deployed to generate output in real-world applications (also referred to as "inference").

In some examples, a trained ML model may be fine-tuned, meaning that the values of the learned parameters may be adjusted slightly in order for the ML model to better model a specific task. Fine-tuning of an ML model typically involves further training the ML model on a number of data samples (which may be smaller in number/cardinality than those used to train the model initially) that closely target the specific task. For example, an ML model for generating natural language that has been trained generically on publically-available text corpora may be, e.g., fine-tuned by further training using specific training samples. The specific training samples can be used to generate language in a certain style or in a certain format. For example, the ML model can be trained to generate a blog post having a particular style and structure with a given topic.

Some concepts in ML-based language models are now discussed. It may be noted that, while the term "language model" has been commonly used to refer to a ML-based language model, there could exist non-ML language models. In the present disclosure, the term "language model" may be used as shorthand for an ML-based language model (i.e., a language model that is implemented using a neural network or other ML architecture), unless stated otherwise. For example, unless stated otherwise, the "language model" encompasses LLMs.

A language model may use a neural network (typically a DNN) to perform natural language processing (NLP) tasks. A language model may be trained to model how words relate to each other in a textual sequence, based on probabilities. A language model may contain hundreds of thousands of learned parameters or in the case of a large language model (LLM) may contain millions or billions of learned parameters or more. As non-limiting examples, a language model can generate text, translate text, summarize text, answer questions, write code (e.g., Phyton, JavaScript, or other programming languages), classify text (e.g., to identify spam emails), create content for various purposes (e.g., social media content, factual content, or marketing content), or create personalized content for a particular individual or group of individuals. Language models can also be used for chatbots (e.g., virtual assistance).

In recent years, there has been interest in a type of neural network architecture, referred to as a transformer, for use as language models. For example, the Bidirectional Encoder Representations from Transformers (BERT) model, the Transformer-XL model, and the Generative Pre-trained Transformer (GPT) models are types of transformers. A transformer is a type of neural network architecture that uses self-attention mechanisms in order to generate predicted output based on input data that has some sequential meaning (i.e., the order of the input data is meaningful, which is the case for most text input). Although transformer-based language models are described herein, it should be understood that the present disclosure may be applicable to any ML-based language model, including language models based on other neural network architectures such as recurrent neural network (RNN)-based language models.

Figure 6:
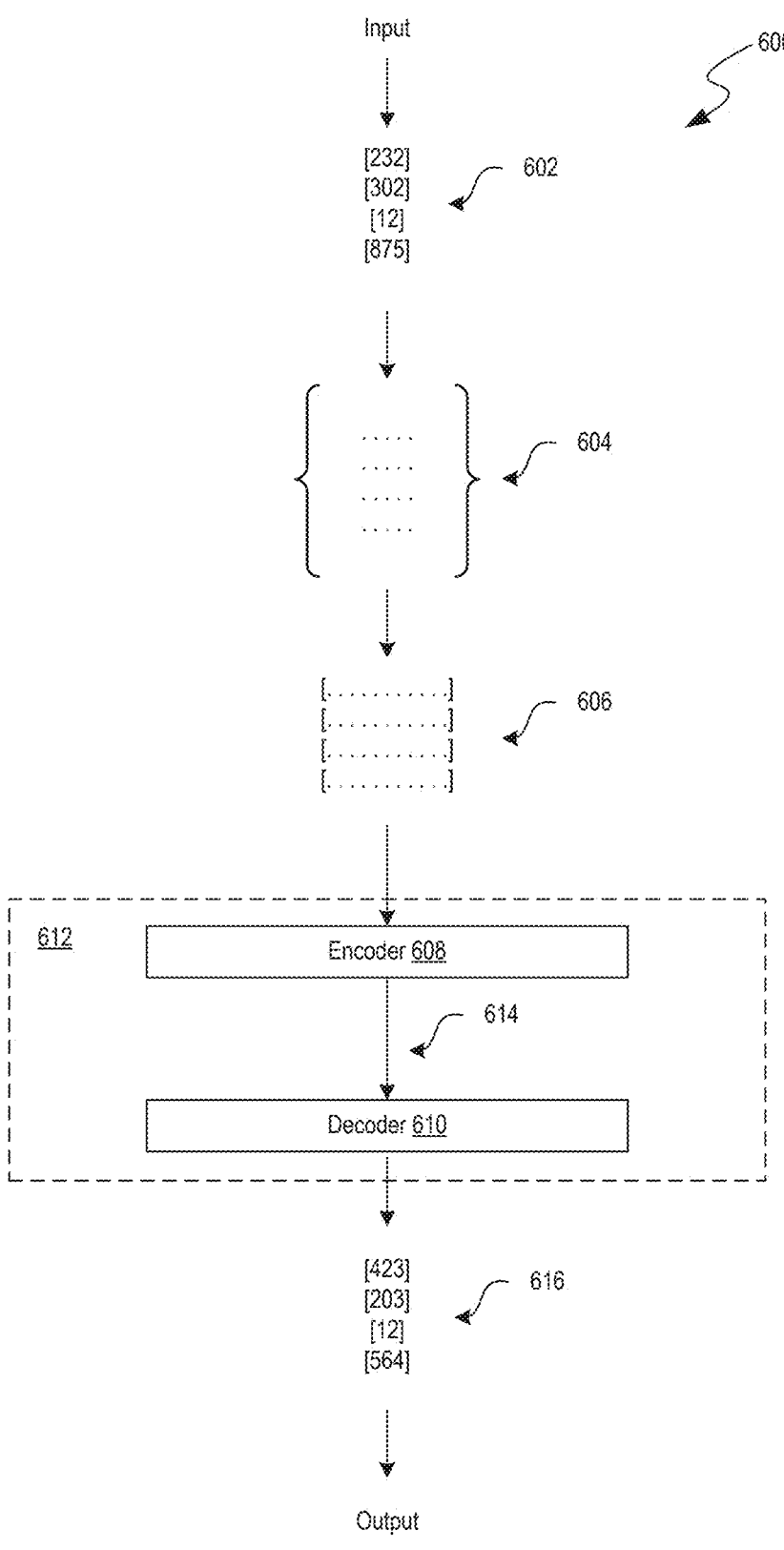
FIG. 6 is a block diagram of an example transformer that can implement aspects of the present technology.

FIG. 6 is a block diagram of an example transformer 612 that can implement aspects of the present technology. A transformer is a type of neural network architecture that uses self-attention mechanisms to generate predicted output based on input data that has some sequential meaning (i.e., the order of the input data is meaningful, which is the case for most text input). Self-attention is a mechanism that relates different positions of a single sequence to compute a representation of the same sequence. Although transformer-based language models are described herein, it should be understood that the present disclosure may be applicable to any machine learning (ML)-based language model, including language models based on other neural network architectures such as recurrent neural network (RNN)-based language models.

The transformer 612 includes an encoder 608 (which can comprise one or more encoder layers/blocks connected in series) and a decoder 610 (which can comprise one or more decoder layers/blocks connected in series). Generally, the encoder 608 and the decoder 610 each include a plurality of neural network layers, at least one of which can be a self-attention layer. The parameters of the neural network layers can be referred to as the parameters of the language model.

The transformer 612 can be trained to perform certain functions on a natural language input. For example, the functions include summarizing existing content, brainstorming ideas, writing a rough draft, fixing spelling and grammar, and translating content. Summarizing can include extracting key points from an existing content in a high-level summary. Brainstorming ideas can include generating a list of ideas based on provided input. For example, the ML model can generate a list of names for a startup or costumes for an upcoming party. Writing a rough draft can include generating writing in a particular style that could be useful as a starting point for the user's writing. The style can be identified as, e.g., an email, a blog post, a social media post, or a poem. Fixing spelling and grammar can include correcting errors in an existing input text. Translating can include converting an existing input text into a variety of different languages. In some embodiments, the transformer 612 is trained to perform certain functions on other input formats than natural language input. For example, the input can include objects, images, audio content, or video content, or a combination thereof.

The transformer 612 can be trained on a text corpus that is labeled (e.g., annotated to indicate verbs, nouns) or unlabeled. Large language models (LLMs) can be trained on a large unlabeled corpus. The term "language model," as used herein, can include an ML-based language model (e.g., a language model that is implemented using a neural network or other ML architecture), unless stated otherwise. Some LLMs can be trained on a large multi-language, multi-domain corpus to enable the model to be versatile at a variety of language-based tasks such as generative tasks (e.g., generating human-like natural language responses to natural language input). FIG. 6 illustrates an example of how the transformer 612 can process textual input data. Input to a language model (whether transformer-based or otherwise) typically is in the form of natural language that can be parsed into tokens. It should be appreciated that the term "token" in the context of language models and Natural Language Processing (NLP) has a different meaning from the use of the same term in other contexts such as data security. Tokenization, in the context of language models and NLP, refers to the process of parsing textual input (e.g., a character, a word, a phrase, a sentence, a paragraph) into a sequence of shorter segments that are converted to numerical representations referred to as tokens (or "compute tokens"). Typically, a token can be an integer that corresponds to the index of a text segment (e.g., a word) in a vocabulary dataset. Often, the vocabulary dataset is arranged by frequency of use. Commonly occurring text, such as punctuation, can have a lower vocabulary index in the dataset and thus be represented by a token having a smaller integer value than less commonly occurring text. Tokens frequently correspond to words, with or without white space appended. In some examples, a token can correspond to a portion of a word.

For example, the word "greater" can be represented by a token for [great] and a second token for [er]. In another example, the text sequence "write a summary" can be parsed into the segments [write], 1, and [summary], each of which can be represented by a respective numerical token. In addition to tokens that are parsed from the textual sequence (e.g., tokens that correspond to words and punctuation), there can also be special tokens to encode non-textual information. For example, a [CLASS] token can be a special token that corresponds to a classification of the textual sequence (e.g., can classify the textual sequence as a list, a paragraph), an [EOT] token can be another special token that indicates the end of the textual sequence, other tokens can provide formatting information, etc.

In FIG. 6, a short sequence of tokens 602 corresponding to the input text is illustrated as input to the transformer 612. Tokenization of the text sequence into the tokens 602 can be performed by some pre-processing tokenization module such as, for example, a byte-pair encoding tokenizer (the "pre" referring to the tokenization occurring prior to the processing of the tokenized input by the LLM), which is not shown in FIG. 6 for simplicity. In general, the token sequence that is inputted to the transformer 612 can be of any length up to a maximum length defined based on the dimensions of the transformer 612. Each token 602 in the token sequence is converted into an embedding vector 606 (also referred to simply as an embedding 606). An embedding 606 is a learned numerical representation (such as, for example, a vector) of a token that captures some semantic meaning of the text segment represented by the token 602. The embedding 606 represents the text segment corresponding to the token 602 in a way such that embeddings corresponding to semantically related text are closer to each other in a vector space than embeddings corresponding to semantically unrelated text. For example, assuming that the words "write," "a," and "summary" each correspond to, respectively, a "write" token, an "a" token, and a "summary" token when tokenized, the embedding 606 corresponding to the "write" token will be closer to another embedding corresponding to the "jot down" token in the vector space as compared to the distance between the embedding 606 corresponding to the "write" token and another embedding corresponding to the "summary" token.

The vector space can be defined by the dimensions and values of the embedding vectors. Various techniques can be used to convert a token 602 to an embedding 606. For example, another trained ML model can be used to convert the token 602 into an embedding 606. In particular, another trained ML model can be used to convert the token 602 into an embedding 606 in a way that encodes additional information into the embedding 606 (e.g., a trained ML model can encode positional information about the position of the token 602 in the text sequence into the embedding 606). In some examples, the numerical value of the token 602 can be used to look up the corresponding embedding in an embedding matrix 604 (which can be learned during training of the transformer 612).

The generated embeddings 606 are input into the encoder 608. The encoder 608 serves to encode the embeddings 606 into feature vectors 614 that represent the latent features of the embeddings 606. The encoder 608 can encode positional information (i.e., information about the sequence of the input) in the feature vectors 614. The feature vectors 614 can have very high dimensionality (e.g., on the order of thousands or tens of thousands), with each element in a feature vector 614 corresponding to a respective feature. The numerical weight of each element in a feature vector 614 represents the importance of the corresponding feature. The space of all possible feature vectors 614 that can be generated by the encoder 608 can be referred to as the latent space or feature space.

Conceptually, the decoder 610 is designed to map the features represented by the feature vectors 614 into meaningful output, which can depend on the task that was assigned to the transformer 612. For example, if the transformer 612 is used for a translation task, the decoder 610 can map the feature vectors 614 into text output in a target language different from the language of the original tokens 602. Generally, in a generative language model, the decoder 610 serves to decode the feature vectors 614 into a sequence of tokens. The decoder 610 can generate output tokens 616 one by one. Each output token 616 can be fed back as input to the decoder 610 in order to generate the next output token 616. By feeding back the generated output and applying self-attention, the decoder 610 is able to generate a sequence of output tokens 616 that has sequential meaning (e.g., the resulting output text sequence is understandable as a sentence and obeys grammatical rules). The decoder 610 can generate output tokens 616 until a special [EOT] token (indicating the end of the text) is generated. The resulting sequence of output tokens 616 can then be converted to a text sequence in post-processing. For example, each output token 616 can be an integer number that corresponds to a vocabulary index. By looking up the text segment using the vocabulary index, the text segment corresponding to each output token 616 can be retrieved, the text segments can be concatenated together, and the final output text sequence can be obtained.

In some examples, the input provided to the transformer 612 includes instructions to perform a function on an existing text. In some examples, the input provided to the transformer includes instructions to perform a function on an existing text. The output can include, for example, a modified version of the input text and instructions to modify the text. The modification can include summarizing, translating, correcting grammar or spelling, changing the style of the input text, lengthening or shortening the text, or changing the format of the text. For example, the input can include the question "What is the weather like in Australia?" and the output can include a description of the weather in Australia.

Although a general transformer architecture for a language model and its theory of operation have been described above, this is not intended to be limiting. Existing language models include language models that are based only on the encoder of the transformer or only on the decoder of the transformer. An encoder-only language model encodes the input text sequence into feature vectors that can then be further processed by a task-specific layer (e.g., a classification layer). BERT is an example of a language model that can be considered to be an encoder-only language model. A decoder-only language model accepts embeddings as input and can use auto-regression to generate an output text sequence. Transformer-XL and GPT-type models can be language models that are considered to be decoder-only language models.

Because GPT-type language models tend to have a large number of parameters, these language models can be considered LLMs. An example of a GPT-type LLM is GPT-3. GPT-3 is a type of GPT language model that has been trained (in an unsupervised manner) on a large corpus derived from documents available to the public online. GPT-3 has a very large number of learned parameters (on the order of hundreds of billions), is able to accept a large number of tokens as input (e.g., up to 2,048 input tokens), and is able to generate a large number of tokens as output (e.g., up to 2,048 tokens). GPT-3 has been trained as a generative model, meaning that it can process input text sequences to predictively generate a meaningful output text sequence. ChatGPT is built on top of a GPT-type LLM and has been fine-tuned with training datasets based on text-based chats (e.g., chatbot conversations). ChatGPT is designed for processing natural language, receiving chat-like inputs, and generating chat-like outputs.

A computer system can access a remote language model (e.g., a cloud-based language model), such as ChatGPT or GPT-3, via a software interface (e.g., an API). Additionally or alternatively, such a remote language model can be accessed via a network such as, for example, the Internet. In some implementations, such as, for example, potentially in the case of a cloud-based language model, a remote language model can be hosted by a computer system that can include a plurality of cooperating (e.g., cooperating via a network) computer systems that can be in, for example, a distributed arrangement. Notably, a remote language model can employ a plurality of processors (e.g., hardware processors such as, for example, processors of cooperating computer systems). Indeed, processing of inputs by an LLM can be computationally expensive/can involve a large number of operations (e.g., many instructions can be executed/large data structures can be accessed from memory), and providing output in a required timeframe (e.g., real time or near real time) can require the use of a plurality of processors/cooperating computing devices as discussed above.

Inputs to an LLM can be referred to as a prompt, which is a natural language input that includes instructions to the LLM to generate a desired output. A computer system can generate a prompt that is provided as input to the LLM via its API. As described above, the prompt can optionally be processed or pre-processed into a token sequence prior to being provided as input to the LLM via its API. A prompt can include one or more examples of the desired output, which provides the LLM with additional information to enable the LLM to generate output according to the desired output. Additionally or alternatively, the examples included in a prompt can provide inputs (e.g., example inputs) corresponding to/as can be expected to result in the desired outputs provided. A one-shot prompt refers to a prompt that includes one example, and a few-shot prompt refers to a prompt that includes multiple examples. A prompt that includes no examples can be referred to as a zero-shot prompt.

Computer System

Figure 7:
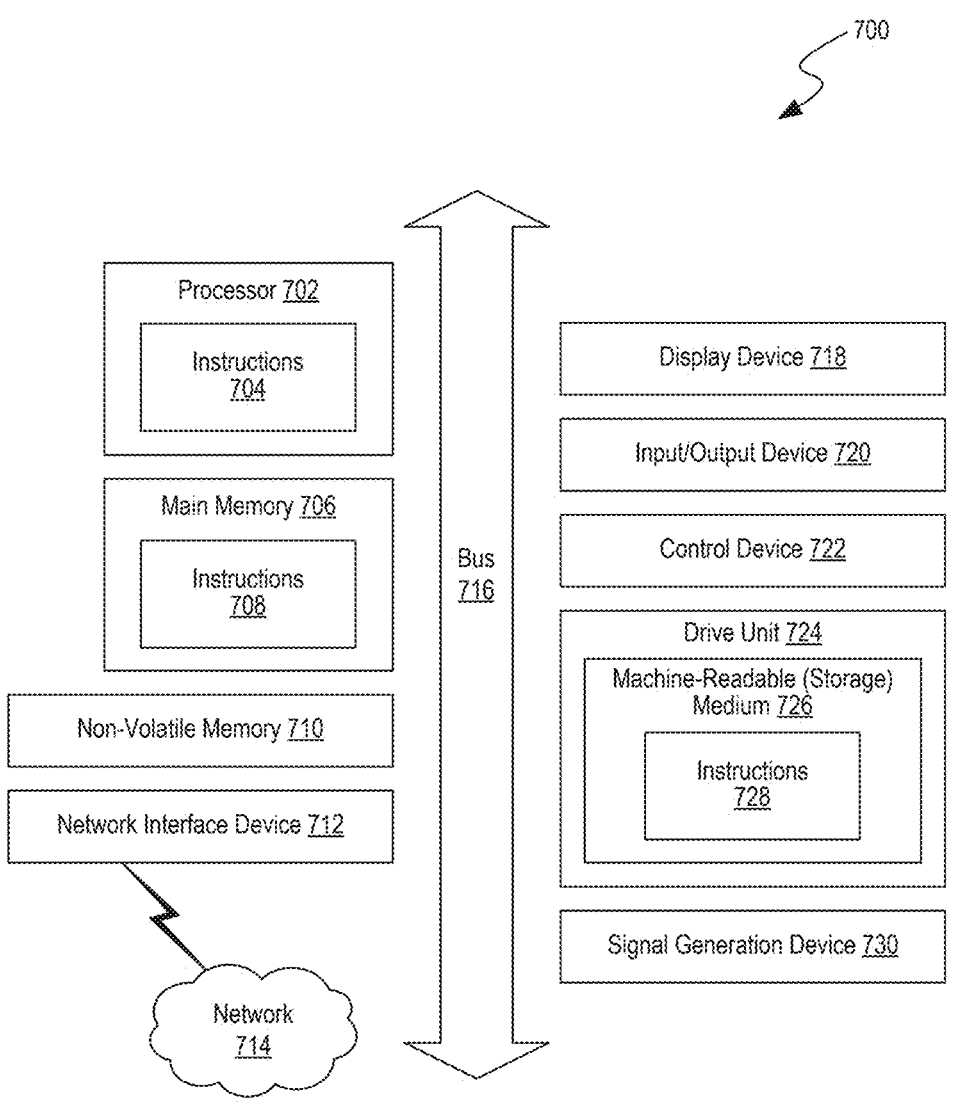
FIG. 7 is a block diagram that illustrates an example of a computer system in which at least some operations described herein can be implemented.

FIG. 7 is a block diagram that illustrates an example of a computer system 700 in which at least some operations described herein can be implemented. As shown, the computer system 700 can include: one or more processors 702, main memory 706, non-volatile memory 710, a network interface device 712, a video display device 718, an input/output device 720, a control device 722 (e.g., keyboard and pointing device), a drive unit 724 that includes a machine-readable (storage) medium 726, and a signal generation device 730 that are communicatively connected to a bus 716. The bus 716 represents one or more physical buses and/or point-to-point connections that are connected by appropriate bridges, adapters, or controllers. Various common components (e.g., cache memory) are omitted from FIG. 7 for brevity. Instead, the computer system 700 is intended to illustrate a hardware device on which components illustrated or described relative to the examples of the figures and any other components described in this specification can be implemented.

The computer system 700 can take any suitable physical form. For example, the computing system 700 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 700. In some implementations, the computer system 700 can be an embedded computer system, a system-on-chip (SOC), a single-board computer system (SBC), or a distributed system such as a mesh of computer systems, or it can include one or more cloud components in one or more networks. Where appropriate, one or more computer systems 700 can perform operations in real time, in near real time, or in batch mode.

The network interface device 712 enables the computing system 700 to mediate data in a network 714 with an entity that is external to the computing system 700 through any communication protocol supported by the computing system 700 and the external entity. Examples of the network interface device 712 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 706, non-volatile memory 710, machine-readable medium 726) can be local, remote, or distributed. Although shown as a single medium, the machine-readable medium 726 can include multiple media (e.g., a centralized/distributed database and/or associated caches and servers) that store one or more sets of instructions 728. The machine-readable medium 726 can include any medium that is capable of storing, encoding, or carrying a set of instructions for execution by the computing system 700. The machine-readable medium 726 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory 710, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 704, 708, 728) set at various times in various memory and storage devices in computing device(s). When read and executed by the processor 702, the instruction(s) cause the computing system 700 to perform operations to execute elements involving the various aspects of the disclosure.

Further Examples

A method for building a digital twin network of a modular synthetic digital modeling system of a telecommunications network can include identifying a set of actual network services of a telecommunications network, each actual network service comprising a required data schema format for transmitting data via the network service. For each data payload type in a set of submissible data payload types originating from a virtual world environment, the method can include identifying a set of compliant network services from the set of actual network services, wherein the data payload type satisfies the required data schema format for each compliant network service, determining, via a generative machine learning model, a set of non-compliant network services from the set of actual network services that correspond to required data schema formats with high content similarity to the data payload type, wherein the data payload type fails to satisfy the required data schema format for each non-compliant network service, and assigning, from context parameters of the virtual world environment that are available for submission with the data payload type, a set of required context parameters for each network service from the set of compliant network services and the set of non-compliant network services. The method can include generating a service modality configuration that maps each submissible data payload type of the virtual world environment to a set of available network services of the telecommunications network that comprises the set of compliant network services and the set of non-compliant network services. The method can include creating, based on the service modality configuration, the digital twin network including a set of synthetic network services that correspond to the set of available network services, wherein a runtime configuration of each synthetic network service is functionally similar to the runtime configuration of the corresponding available network service.

In some implementations, the method can include receiving real-time performance data samples from the available network services of the telecommunications network, each data sample comprising a source data payload and a first time-series measurement of at least one monitored KPI for an actual network service used to transmit the source data payload. For each data sample from the real-time performance data samples, the method can include identifying a target synthetic network service of the digital twin network that corresponds to the actual network service used to transmit the data payload, responsive to transmitting the source payload via the target synthetic network service of the digital twin network, generating a second time-series measurement of the at least one monitored KPI for the target synthetic network service, determining, using the first and the second time-series measurements of the at least one monitored KPI, a performance similarity score between the actual network service and the target synthetic network, when the performance similarity score exceeds a tolerance threshold, and apply an adjustment to the runtime configuration of the target synthetic network that causes runtime performance of the at least one monitored KPI for the synthetic network service to match the runtime performance of the at least one monitored KPI for the actual network service.

In some implementations, the adjustment applied to the runtime configuration of the target synthetic network comprises an addition of new network service features, a removal of network service features, a temporary pause of network service features, an adjustment to network service parameters, an update to a prior configuration version of the network service, operations of a self-organizing network (SON), modifications based on standardized algorithms, or a combination thereof.

In some implementations, the method for transmitting the source payload via the digital twin network can further include determining, using the service modality configuration, a required data schema for the source data payload of the target synthetic network service. The method can include responsive to the source data payload not satisfying the required data schema for the source data payload, prompting a generative machine learning model to generate a modified data payload comprising translated contents of the source data payload that satisfy the required data schema.

In some implementations, the method can include, for each second data payload type in a second set of submissible data payload types originating from a second virtual world environment, identifying a second set of compliant network services from the set of actual network services, wherein the second data payload type satisfies the required data schema format for each compliant network service, determining, via a generative machine learning model, a second set of non-compliant network services from the set of actual network services that correspond to required data schema formats with high content similarity to the second data payload type, wherein the second data payload type fails to satisfy the required data schema format for each non-compliant network service, and assigning, from context parameters of the second virtual world environment that are available for submission with the second data payload type, a second set of required context parameters for each network service from the set of compliant network services and the set of non-compliant network services. The method can include updating the service modality configuration to map each second data payload type of the second virtual world environment to a second set of available network services of the telecommunications network that comprises the second set of compliant network services and the second set of non-compliant network services.

In some implementations, the digital twin network is a first digital twin network configured to execute a first set of user requests for transmitting data from the virtual world environment. The method can include creating, based on the service modality configuration, a second digital twin network including the set of synthetic network services of the first digital twin network that correspond to the set of available network services, wherein the second digital twin network is configured to execute a second set of user requests for transmitting data from the virtual world environment.

In some implementations, the method can include receiving at least one virtual user identifier that corresponds to at least one subscribing user of the virtual world environment; identifying a network user identifier of a subscribing user of the telecommunications network that is associated with the at least one virtual user identifier of the virtual world environment. The method can include determining, using the network user identifier, a set of prior network services used by the subscribing user of the telecommunications network. The method can include generating a second modality configuration that maps each submissible data payload type of the virtual world environment to a subset of available network services of the telecommunications network that are included in the set of prior network services.

A non-transitory, computer-readable storage medium comprising instructions recorded thereon that, when executed by at least one processor of a modular synthetic modeling system of a wireless telecommunications network, cause the modular synthetic modeling system to receive, via an application programming interface (API), a user request from a virtual world environment for transmitting data using synthetic network services of a digital twin network of the telecommunications network, wherein the user request comprises a virtual user identifier, a data payload, and a set of request context parameters associated with the virtual world environment. The instructions can cause the modular synthetic modeling system to determine a network user identifier of a subscribing user of the telecommunications network that is associated with the virtual user identifier of the user request from the virtual world environment. The instructions can cause the modular synthetic modeling system to access, using the network user identifier, a service modality configuration of the digital twin network that maps the data payload to a set of available synthetic network services, wherein each available synthetic network service comprises a set of required context parameters associated with the virtual world environment. The instructions can cause the modular synthetic modeling system to select, from the set of available synthetic network services of the service modality configuration, a synthetic network service of the digital twin network for transmitting the data payload, wherein the set of request context parameters of the user request satisfies the set of required context parameters of the selected synthetic network service, and wherein the synthetic network service of the digital twin network corresponds to an actual network service of the telecommunications network. The instructions can cause the modular synthetic modeling system to transmit, via the selected synthetic network service of the digital twin network, the data payload of the user request. The instructions can cause the modular synthetic modeling system to responsive to at least one monitored key performance indicator (KPI) for the selected synthetic network service of the digital twin network exceeding a tolerance threshold: identify a first runtime configuration of the synthetic network service of the digital twin network and a second runtime configuration of the actual network service of the telecommunications network, wherein the first runtime configuration is associated with the at least one monitored KPI for the synthetic network service, and wherein the second runtime configuration is functionally similar to the first runtime configuration, apply a corrective adjustment to the first runtime configuration of the synthetic network service of the digital twin network, wherein the corrective adjustment causes runtime performance of the at least one monitored KPI to be within the tolerance threshold, and apply the corrective adjustment to the second runtime configuration of the actual network service of the telecommunications network.

In some implementations, the instructions of the non-transitory, computer-readable storage medium can cause the modular synthetic modeling system to responsive to at least one monitored KPI for the actual network service of the telecommunications network exceeding a second tolerance threshold: identify a third runtime configuration of the actual network service of the telecommunications network and a fourth runtime configuration of the synthetic network service of the digital twin network, wherein the third runtime configuration is associated with the at least one monitored KPI for the actual network service, and wherein the fourth runtime configuration is functionally similar to the third runtime configuration, apply a second corrective adjustment to the third runtime configuration of the actual network service of the telecommunications network, wherein the second corrective adjustment causes runtime performance of the at least monitored KPI of the actual network service to be within the second tolerance threshold, and apply the second corrective adjustment to the fourth runtime configuration of the synthetic network service of the digital twin network.

In some implementations, the user request from the virtual world environment further comprises a recipient user identifier of a recipient subscribing user of the telecommunications network, and wherein the instructions that cause the modular synthetic modeling system to transmit the data payload of the user request further cause the modular synthetic modeling system to: present, at a user interface of the recipient subscribing user, contents of the data payload of the user request.

In some implementations, the recipient user identifier is a second virtual user identifier of a second virtual world environment, and wherein the instructions further cause the modular synthetic modeling system to: determine a second network user identifier of the recipient subscribing user that is associated with the second virtual user identifier, identify a set of recipient context parameters associated with the second virtual world environment, access, using the second network user identifier, a second service modality configuration that maps the selected synthetic network service of the digital twin network to a set of available data formats of the data payload, wherein each available data format comprises a set of required context parameters associated with the second virtual world environment, select, from the set of available data formats of the service modality configuration, a data format for presenting the data payload at the user interface of the recipient subscribing user, wherein the set of recipient context parameters satisfies the set of required context parameters of the selected data format, and configure the contents of the data payload of the user request to be presented according to the selected data format.

In some implementations, the instructions of the non-transitory, computer-readable storage medium can cause the modular synthetic modeling system to determine, from the synthetic network service of the digital twin network, a first service consumption rate representative of approximate usage of the synthetic network service by subscribing users of the virtual world environment. The instructions can cause the modular synthetic modeling system to determine, from the actual network service of the telecommunications network, a second service consumption rate representative of approximate usage of the network service by subscribing users of the telecommunications network. The instructions can cause the modular synthetic modeling system to estimate, using the first and the second service consumption rates, an equivalence factor for scaling the first service consumption rate of the synthetic network service to match the second service consumption rate of the actual network service. The instructions can cause the modular synthetic modeling system to adjust the tolerance threshold of the at least one monitored KPI for the synthetic network service based on the equivalence factor.

In some implementations, the instructions of the non-transitory, computer-readable storage medium can cause the modular synthetic modeling system to determine, from the service modality configuration, a required data schema for the data payload when transmitting via the selected synthetic network service of the digital twin network. The instructions can cause the modular synthetic modeling system to responsive to the data payload not satisfying the required data schema, prompt a generative machine learning model to generate a modified data payload comprising translated contents of the data payload that satisfy the required data schema.

In some implementations, the instructions of the non-transitory, computer-readable storage medium can cause the modular synthetic modeling system to determine, using the network user identifier, a set of actual network services previously used by the subscribing user of the telecommunications network. The instructions can cause the modular synthetic modeling system to prompt, using the set of actual network services, a generative machine learning model to identify at least one actual network service that comprises a required data schema relevant to contents of the data payload. The instructions can cause the modular synthetic modeling system to determine, from the digital twin network, at least one synthetic network service that corresponds to the identified at least one actual network service of the telecommunications network. The instructions can cause the modular synthetic modeling system to responsive to an absence of the at least one synthetic network service from the service modality configuration, add the at least one synthetic network service to the set of available synthetic network services for transmitting the data payload.

In some implementations, the instructions of the non-transitory, computer-readable storage medium can cause the modular synthetic modeling system to receive, from an authorized user via a user interface, a temporary adjustment of runtime configurations for a set of target synthetic network services of the digital twin network, wherein the temporary adjustment is configured to cause, for each target synthetic network service, at least one of: (1) a termination of network service features, (2) an embedding of erroneous network service features, or (3) a security vulnerability of network service features. The instructions can cause the modular synthetic modeling system to responsive to applying the temporary adjustment to the runtime configurations for the set of target synthetic network services, monitor at least one target KPI for each target synthetic network service. The instructions can cause the modular synthetic modeling system to display, at the user interface, a real-time performance report of the monitored at least one target KPI for the set of target synthetic network services.

In some implementations, the instructions of the non-transitory, computer-readable storage medium can cause the modular synthetic modeling system to when the monitored at least one target KPI for at least one target synthetic network service exceeds a target tolerance threshold, prompt a generative machine learning model to generate a set of recommended corrective adjustments for causing runtime performance of the at least one monitored KPI to be within the target tolerance threshold. The instructions can cause the modular synthetic modeling system to display, at the user interface, the set of recommended corrective adjustments alongside the real-time performance report.

In some implementations, the corrective adjustment applied to the first and the second runtime configurations comprises an addition of new network service features, a removal of network service features, a temporary pause of network service features, an adjustment to network service parameters, an update to a prior configuration version of the network service, operations of a self-organizing network (SON), modifications based on standardized algorithms, or a combination thereof.

In some implementations, the network user identifier of the subscribing user of the telecommunications network comprises a Mobile Station International Subscriber Directory Number (MSISDN), an International Mobile Subscriber Identity (IMSI), an International Mobile Equipment Identity (IMEI), an Integrated Circuit Card Identifier (ICCID), a Temporary Mobile Subscriber Identity (TMSI), a Globally Unique Temporary Identifier (GUTI), or a combination thereof.

In some implementations, the set of request context parameters associated with the virtual world environment comprises a location, a timestamp, a set of movement parameters for entities of the virtual world environment, a set of local environment parameters, a specified network service feature, a set of accessible user interface elements, or a combination thereof.

Remarks

The terms "example," "embodiment," and "implementation" are used interchangeably. For example, references to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described that can be exhibited by some examples and not by others. Similarly, various requirements are described that can be requirements for some examples but not for other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms either in this application or in a continuing application.

We claim:

1. A method for building a digital twin network of a modular synthetic digital modeling system of a telecommunications network, the method comprising:

identifying a set of actual network services of a telecommunications network, each actual network service comprising a required data schema format for transmitting data via the network service;

for each data payload type in a set of submissible data payload types originating from a virtual world environment:

identifying a set of compliant network services from the set of actual network services, wherein the data payload type satisfies the required data schema format for each compliant network service, determining, via a generative machine learning model, a set of non-compliant network services from the set of actual network services that correspond to required data schema formats with high content similarity to the data payload type, wherein the data payload type fails to satisfy the required data schema format for each non-compliant network service, and assigning, from context parameters of the virtual world environment that are available for submission with the data payload type, a set of required context parameters for each network service from the set of compliant network services and the set of non-compliant network services;

generating a service modality configuration that maps each submissible data payload type of the virtual world environment to a set of available network services of the telecommunications network that comprises the set of compliant network services and the set of non-compliant network services;

creating, based on the service modality configuration, the digital twin network including a set of synthetic network services that correspond to the set of available network services, wherein a runtime configuration of each synthetic network service is functionally similar to the runtime configuration of the corresponding available network service;

receiving real-time performance data samples from the available network services of the telecommunications network, each data sample comprising a source data payload and a first time-series measurement of at least one monitored key performance indicator (KPI) for an actual network service used to transmit the source data payload; and for each data sample from the real-time performance data samples:

identifying a target synthetic network service of the digital twin network that corresponds to the actual network service used to transmit the data payload, responsive to transmitting the source payload via the target synthetic network service of the digital twin network, generating a second time-series measurement of the at least one monitored KPI for the target synthetic network service, determining, using the first and the second time-series measurements of the at least one monitored KPI, a performance similarity score between the actual network service and the target synthetic network, and when the performance similarity score exceeds a tolerance threshold, applying an adjustment to the runtime configuration of the target synthetic network that causes runtime performance of the at least one monitored KPI for the synthetic network service to match the runtime performance of the at least one monitored KPI for the actual network service.

2. The method of claim 1, wherein the adjustment applied to the runtime configuration of the target synthetic network comprises an addition of new network service features, a removal of network service features, a temporary pause of network service features, an adjustment to network service parameters, an update to a prior configuration version of the network service, operations of a self-organizing network (SON), modifications based on standardized algorithms, or a combination thereof.

3. The method of claim 1, wherein transmitting the source payload via the digital twin network further comprises:

determining, using the service modality configuration, a required data schema for the source data payload of the target synthetic network service; and responsive to the source data payload not satisfying the required data schema for the source data payload, prompting a generative machine learning model to generate a modified data payload comprising translated contents of the source data payload that satisfy the required data schema.

4. The method of claim 1, further comprising:

for each second data payload type in a second set of submissible data payload types originating from a second virtual world environment:

identifying a second set of compliant network services from the set of actual network services, wherein the second data payload type satisfies the required data schema format for each compliant network service, determining, via a generative machine learning model, a second set of non-compliant network services from the set of actual network services that correspond to required data schema formats with high content similarity to the second data payload type, wherein the second data payload type fails to satisfy the required data schema format for each non-compliant network service, and assigning, from context parameters of the second virtual world environment that are available for submission with the second data payload type, a second set of required context parameters for each network service from the set of compliant network services and the set of non-compliant network services; and updating the service modality configuration to map each second data payload type of the second virtual world environment to a second set of available network services of the telecommunications network that comprises the second set of compliant network services and the second set of non-compliant network services.

5. The method of claim 1, wherein the digital twin network is a first digital twin network configured to execute a first set of user requests for transmitting data from the virtual world environment, and wherein the method further comprises:

creating, based on the service modality configuration, a second digital twin network including the set of synthetic network services of the first digital twin network that correspond to the set of available network services, wherein the second digital twin network is configured to execute a second set of user requests for transmitting data from the virtual world environment.

6. The method of claim 1, further comprising:

receiving at least one virtual user identifier that corresponds to at least one subscribing user of the virtual world environment;

identifying a network user identifier of a subscribing user of the telecommunications network that is associated with the at least one virtual user identifier of the virtual world environment;

determining, using the network user identifier, a set of prior network services used by the subscribing user of the telecommunications network; and generating a second modality configuration that maps each submissible data payload type of the virtual world environment to a subset of available network services of the telecommunications network that are included in the set of prior network services.

7. A non-transitory, computer-readable storage medium comprising instructions recorded thereon that, when executed by at least one processor of a modular synthetic modeling system of a wireless telecommunications network, cause the modular synthetic modeling system to:

receive, via an application programming interface (API), a user request from a virtual world environment for transmitting data using synthetic network services of a digital twin network of the telecommunications network, wherein the user request comprises a virtual user identifier, a data payload, and a set of request context parameters associated with the virtual world environment;

determine a network user identifier of a subscribing user of the telecommunications network that is associated with the virtual user identifier of the user request from the virtual world environment;

access, using the network user identifier, a service modality configuration of the digital twin network that maps the data payload to a set of available synthetic network services, wherein each available synthetic network service comprises a set of required context parameters associated with the virtual world environment;

select, from the set of available synthetic network services of the service modality configuration, a synthetic network service of the digital twin network for transmitting the data payload, wherein the set of request context parameters of the user request satisfies the set of required context parameters of the selected synthetic network service, and wherein the synthetic network service of the digital twin network corresponds to an actual network service of the telecommunications network;

transmit, via the selected synthetic network service of the digital twin network, the data payload of the user request; and responsive to at least one monitored key performance indicator (KPI) for the selected synthetic network service of the digital twin network exceeding a tolerance threshold:

identify a first runtime configuration of the synthetic network service of the digital twin network and a second runtime configuration of the actual network service of the telecommunications network, wherein the first runtime configuration is associated with the at least one monitored KPI for the synthetic network service, and wherein the second runtime configuration is functionally similar to the first runtime configuration, apply a corrective adjustment to the first runtime configuration of the synthetic network service of the digital twin network, wherein the corrective adjustment causes runtime performance of the at least one monitored KPI to be within the tolerance threshold, and apply the corrective adjustment to the second runtime configuration of the actual network service of the telecommunications network.

8. The non-transitory, computer-readable storage medium of claim 7, wherein the instructions further cause the modular synthetic modeling system to:

responsive to at least one monitored KPI for the actual network service of the telecommunications network exceeding a second tolerance threshold:

identify a third runtime configuration of the actual network service of the telecommunications network and a fourth runtime configuration of the synthetic network service of the digital twin network, wherein the third runtime configuration is associated with the at least one monitored KPI for the actual network service, and wherein the fourth runtime configuration is functionally similar to the third runtime configuration, apply a second corrective adjustment to the third runtime configuration of the actual network service of the telecommunications network, wherein the second corrective adjustment causes runtime performance of the at least monitored KPI of the actual network service to be within the second tolerance threshold, and apply the second corrective adjustment to the fourth runtime configuration of the synthetic network service of the digital twin network.

9. The non-transitory, computer-readable storage medium of claim 7, wherein the user request from the virtual world environment further comprises a recipient user identifier of a recipient subscribing user of the telecommunications network, and wherein the instructions that cause the modular synthetic modeling system to transmit the data payload of the user request further cause the modular synthetic modeling system to:

present, at a user interface of the recipient subscribing user, contents of the data payload of the user request.

10. The non-transitory, computer-readable storage medium of claim 9, wherein the recipient user identifier is a second virtual user identifier of a second virtual world environment, and wherein the instructions further cause the modular synthetic modeling system to:

determine a second network user identifier of the recipient subscribing user that is associated with the second virtual user identifier;

identify a set of recipient context parameters associated with the second virtual world environment;

access, using the second network user identifier, a second service modality configuration that maps the selected synthetic network service of the digital twin network to a set of available data formats of the data payload, wherein each available data format comprises a set of required context parameters associated with the second virtual world environment;

select, from the set of available data formats of the service modality configuration, a data format for presenting the data payload at the user interface of the recipient subscribing user, wherein the set of recipient context parameters satisfies the set of required context parameters of the selected data format; and configure the contents of the data payload of the user request to be presented according to the selected data format.

11. The non-transitory, computer-readable storage medium of claim 7, wherein the instructions that further cause the modular synthetic modeling system to:

determine, from the synthetic network service of the digital twin network, a first service consumption rate representative of approximate usage of the synthetic network service by subscribing users of the virtual world environment;

determine, from the actual network service of the telecommunications network, a second service consumption rate representative of approximate usage of the network service by subscribing users of the telecommunications network;

estimate, using the first and the second service consumption rates, an equivalence factor for scaling the first service consumption rate of the synthetic network service to match the second service consumption rate of the actual network service; and adjust the tolerance threshold of the at least one monitored KPI for the synthetic network service based on the equivalence factor.

12. The non-transitory, computer-readable storage medium of claim 7, wherein the instructions further cause the modular synthetic modeling system to:

determine, from the service modality configuration, a required data schema for the data payload when transmitting via the selected synthetic network service of the digital twin network; and responsive to the data payload not satisfying the required data schema, prompt a generative machine learning model to generate a modified data payload comprising translated contents of the data payload that satisfy the required data schema.

13. The non-transitory, computer-readable storage medium of claim 7, wherein the instructions further cause the modular synthetic modeling system to:

determine, using the network user identifier, a set of actual network services previously used by the subscribing user of the telecommunications network;

prompt, using the set of actual network services, a generative machine learning model to identify at least one actual network service that comprises a required data schema relevant to contents of the data payload;

determine, from the digital twin network, at least one synthetic network service that corresponds to the identified at least one actual network service of the telecommunications network; and responsive to an absence of the at least one synthetic network service from the service modality configuration, add the at least one synthetic network service to the set of available synthetic network services for transmitting the data payload.

14. The non-transitory, computer-readable storage medium of claim 7, wherein the instructions further cause the modular synthetic modeling system to:

receive, from an authorized user via a user interface, a temporary adjustment of runtime configurations for a set of target synthetic network services of the digital twin network, wherein the temporary adjustment is configured to cause, for each target synthetic network service, at least one of:

(1) a termination of network service features, (2) an embedding of erroneous network service features, or (3) a security vulnerability of network service features;

responsive to applying the temporary adjustment to the runtime configurations for the set of target synthetic network services, monitor at least one target KPI for each target synthetic network service; and display, at the user interface, a real-time performance report of the monitored at least one target KPI for the set of target synthetic network services.

15. The non-transitory, computer-readable storage medium of claim 14, wherein the instructions further cause the modular synthetic modeling system to:

when the monitored at least one target KPI for at least one target synthetic network service exceeds a target tolerance threshold, prompt a generative machine learning model to generate a set of recommended corrective adjustments for causing runtime performance of the at least one monitored KPI to be within the target tolerance threshold; and display, at the user interface, the set of recommended corrective adjustments alongside the real-time performance report.

16. The non-transitory, computer-readable storage medium of claim 7, wherein the corrective adjustment applied to the first and the second runtime configurations comprises an addition of new network service features, a removal of network service features, a temporary pause of network service features, an adjustment to network service parameters, an update to a prior configuration version of the network service, operations of a self-organizing network (SON), modifications based on standardized algorithms, or a combination thereof.

17. The non-transitory, computer-readable storage medium of claim 7, wherein the network user identifier of the subscribing user of the telecommunications network comprises a Mobile Station International Subscriber Directory Number (MSISDN), an International Mobile Subscriber Identity (IMSI), an International Mobile Equipment Identity (IMEI), an Integrated Circuit Card Identifier (ICCID), a Temporary Mobile Subscriber Identity (TMSI), a Globally Unique Temporary Identifier (GUTI), or a combination thereof.

18. The non-transitory, computer-readable storage medium of claim 7, wherein the set of request context parameters associated with the virtual world environment comprises a location, a timestamp, a set of movement parameters for entities of the virtual world environment, a set of local environment parameters, a specified network service feature, a set of accessible user interface elements, or a combination thereof.

19. A modular synthetic modeling system of a wireless telecommunications network comprising:
   at least one hardware processor; and
   at least one non-transitory memory storing instructions, which, when executed by the at least one hardware processor, cause the modular synthetic modeling system to:
      receive, via an application programming interface (API), a user request from a virtual world environment for transmitting data using synthetic network services of a digital twin network of the telecommunications network,
         wherein the user request comprises a virtual user identifier, a data payload, and a set of request context parameters associated with the virtual world environment;
      determine a network user identifier of a subscribing user of the telecommunications network that is associated with the virtual user identifier of the user request from the virtual world environment;
      access, using the network user identifier, a service modality configuration of the digital twin network that maps the data payload to a set of available synthetic network services,
         wherein each available synthetic network service comprises a set of required context parameters associated with the virtual world environment;
      select, from the set of available synthetic network services of the service modality configuration, a synthetic network service of the digital twin network for transmitting the data payload,
         wherein the set of request context parameters of the user request satisfies the set of required context parameters of the selected synthetic network service, and
         wherein the synthetic network service of the digital twin network corresponds to an actual network service of the telecommunications network;
      transmit, via the selected synthetic network service of the digital twin network, the data payload of the user request; and
      responsive to at least one monitored key performance indicator (KPI) for the selected synthetic network service of the digital twin network exceeding a tolerance threshold:
         identify a first runtime configuration of the synthetic network service of the digital twin network and a second runtime configuration of the actual network service of the telecommunications network,
            wherein the first runtime configuration is associated with the at least one monitored KPI for the synthetic network service, and
            wherein the second runtime configuration is functionally similar to the first runtime configuration,
         apply a corrective adjustment to the first runtime configuration of the synthetic network service of the digital twin network,
            wherein the corrective adjustment causes runtime performance of the at least one monitored KPI to be within the tolerance threshold, and
         apply the corrective adjustment to the second runtime configuration of the actual network service of the telecommunications network.

* * * * *